US012755480B2

(12) United States Patent
Yin et al.

(10) Patent No.: US 12,755,480 B2
(45) Date of Patent: Oct. 6, 2026

(54) AUGMENTING DATA USED TO TRAIN COMPUTER VISION MODEL WITH IMAGES OF DIFFERENT PERSPECTIVES

(71) Applicant: International Business Machines Corporation, Armonk, NY (US)

(72) Inventors: Kun Yan Yin, Ningbo (CN); Xue Ping Liu, Beijing (CN); Yun Jing Zhao, Beijing (CN); Fei Wang, Dalian (CN); Yu Tao Wu, Changshu (CN); Yue Liu, Ningbo (CN)

(73) Assignee: International Business Machines Corporation, Armonk, NY (US)

(*) Notice: Subject to any disclaimer, the term of this patent is extended or adjusted under 35 U.S.C. 154(b) by 326 days.

(21) Appl. No.: 17/952,225

(22) Filed: Sep. 24, 2022

(65) Prior Publication Data

US 2024/0104830 A1 Mar. 28, 2024

(51) Int. Cl.
*G06T 15/20* (2011.01)
*G06T 15/04* (2011.01)
(Continued)

(52) U.S. Cl.
CPC ............ *G06T 15/205* (2013.01); *G06T 15/04* (2013.01); *G06T 17/20* (2013.01); *G06V 10/462* (2022.01);
(Continued)

(58) Field of Classification Search
CPC ....... G06T 15/04; G06T 15/205; G06T 17/20; G06T 2200/08; G06T 2210/12;
(Continued)

(56) References Cited

U.S. PATENT DOCUMENTS

2011/0254840 A1 10/2011 Halstead
2015/0097828 A1 4/2015 Miller
(Continued)

FOREIGN PATENT DOCUMENTS

CN 111932673 A 11/2020
WO 2019203851 A1 10/2019
WO 2021252145 A1 12/2021

OTHER PUBLICATIONS

Kolev K, Brox T, Cremers D. Robust variational segmentation of 3D objects from multiple views. InJoint Pattern Recognition Symposium Sep. 12, 2006 (pp. 688-697). Berlin, Heidelberg: Springer Berlin Heidelberg.*
(Continued)

*Primary Examiner* — Phu K Nguyen
(74) *Attorney, Agent, or Firm* — Heather Schuler

(57) ABSTRACT

A computer-implemented method, system and computer program product for improving accuracy of a vision model. Images of an object with a first set of perspectives are received from a dataset used to train the vision model. A three-dimensional model of the object is then generated using the images of the object from the dataset. Using the three-dimensional model of the object, images of the object with a second set of perspectives are obtained. For example, the second set of perspectives may include different perspectives than the perspectives of the object from the images contained in the dataset. The dataset used to train the vision model may then be augmented with such images of the object with a second set of perspectives. In this manner, the dataset used to train the vision model includes a greater number of perspectives of the object thereby improving the accuracy of the vision model.

20 Claims, 10 Drawing Sheets

(51) Int. Cl.

| | |
|---|---|
| ***G06T 17/20*** | (2006.01) |
| ***G06V 10/46*** | (2022.01) |
| ***G06V 10/764*** | (2022.01) |
| ***G06V 10/774*** | (2022.01) |
| ***G06V 20/64*** | (2022.01) |
| ***G06V 20/70*** | (2022.01) |

(52) U.S. Cl.
CPC .......... *G06V 10/764* (2022.01); *G06V 10/774* (2022.01); *G06V 20/647* (2022.01); *G06V 20/70* (2022.01); *G06T 2200/08* (2013.01); *G06T 2210/12* (2013.01); *G06T 2210/56* (2013.01)

(58) Field of Classification Search
CPC G06T 2210/56; G06V 20/647; G06V 10/764; G06V 20/70; G06V 10/462; G06V 10/774
USPC .......................................................... 345/418
See application file for complete search history.

(56) References Cited

U.S. PATENT DOCUMENTS

| | | | | |
|---|---|---|---|---|
| 2016/0360970 | A1* | 12/2016 | Tzvieli | A61B 5/0075 |
| 2019/0313915 | A1* | 10/2019 | Tzvieli | G01J 5/12 |
| 2019/0371053 | A1* | 12/2019 | Engholm | G06T 17/10 |
| 2021/0280322 | A1* | 9/2021 | Frank | A61B 5/6803 |
| 2022/0245574 | A1* | 8/2022 | Cella | G06Q 10/087 |
| 2022/0358770 | A1* | 11/2022 | Guler | G06T 7/50 |
| 2023/0127651 | A1* | 4/2023 | Cella | G06N 3/045 705/7.11 |
| 2023/0319218 | A1* | 10/2023 | Ren | G06T 3/4038 382/284 |
| 2023/0334754 | A1* | 10/2023 | Kirchmayer | G06T 15/04 |
| 2024/0118702 | A1* | 4/2024 | Cella | G06Q 10/0833 |
| 2024/0265616 | A1* | 8/2024 | Pickard | G06T 7/75 |
| 2024/0324838 | A1* | 10/2024 | Ebrahimi Afrouzi | G05D 1/2446 |
| 2025/0160668 | A1* | 5/2025 | Frank | G01J 5/0265 |

OTHER PUBLICATIONS

Kolev K, Klodt M, Brox T, Cremers D. Continuous global optimization in multiview 3D reconstruction. International Journal of Computer Vision. Aug. 2009;84(1):80-96.*

Yezzi A, Soatto S. Stereoscopic segmentation. International Journal of Computer Vision. Jun. 2003;53(1):31-43.*

Jin H, Yezzi AJ, Tsai YH, Cheng LT, Soatto S. Estimation of 3d surface shape and smooth radiance from 2d images: A level set approach. Journal of Scientific Computing. Dec. 2003;19(1):267-92.*

Ye Z, Yenamandra T, Bernard F, Cremers D. Joint deep multi-graph matching and 3d geometry learning from inhomogeneous 2d image collections. InProceedings of the AAAI Conference on Artificial Intelligence Jun. 28, 2022 (vol. 36, No. 3, pp. 3125-3133).*

Su H, Maji S, Kalogerakis E, Learned-Miller E. Multi-view convolutional neural networks for 3d shape recognition. InProceedings of the IEEE international conference on computer vision 2015 (pp. 945-953).*

Al-afandi J, Magyar B, Horváth A. Saliency Map Based Data Augmentation. arXiv preprint arXiv:2205.14686. May 2022.*

Konrad J, Wang M, Ishwar P, Wu C, Mukherjee D. Learning-based, automatic 2d-to-3d image and video conversion. IEEE Transactions on Image Processing. Jun. 20, 2013;22(9):3485-96.*

Su H, Qi CR, Li Y, Guibas LJ. Render for CNN: Viewpoint Estimation in Images Using CNNs Trained with Rendered 3D Model Views. In2015 IEEE International Conference on Computer Vision (ICCV) Dec. 7, 2015 (pp. 2686-2694). IEEE.*

Kulikajevas A, Maskeliūnas R, Damaševičius R, Ho ES. 3D object reconstruction from imperfect depth data using extended yolov3 network. Sensors. Apr. 3, 2020;20(7):2025.*

Limonchik et al., "3D Model-Based Data Augmentation for Hand Gesture Recognition," http://cs231n.stanford.edu/reports/2017/pdfs/218.pdf, 2017, pp. 1-9.

Dai et al., "A Data-Augmented 3D Morphable Model of the Ear," 13th IEEE International Conference on Automatic Face & Gesture Recognition, 2018, pp. 1-6.

Niri et al., "Multi-View Data Augmentation to Improve Wound Segmentation on 3D Surface Model by Deep Learning," IEEE Access, vol. 9, 2021, pp. 1-11.

Han et al., "Image-Based 3D Object Reconstruction: State-of-the-Art and Trends in the Deep Learning Era," arXiv:1906.06543v3, Nov. 1, 2019, pp. 1-27.

Rishab Sharma, "Deep Learning for 3D Synthesis," https://towardsdatascience.com/deep-learning-for-3d-synthesis-2dd57e2001f, Jan. 14, 2021, pp. 1-15.

Al-Afandi et al., "Saliency Map Based Data Augmentation," arXiv:2205.14686v1, May 29, 2022, pp. 1-10.

Yin et al., "3DStyleNet: Creating 3D Shapes with Geometric and Texture Style Variations," International Conference on Computer Vision, 2021, pp. 1-10.

Fuhrmann et al., "Floating Scale Surface Reconstruction", ACM Transactions on Graphics (TOG), Jul. 27, 2014, 11 pages.

No Author, "Introduction", https://web.archive.org/web/20221208065447/https://github.com/simonfuhrmann/mve, May 26, 2022, 3 pages.

No Author, "MVS-Texturing", https://web.archive.org/web/20220520120115/https://github.com/nmoehrle/mvs-texturing, May 20, 2022, 4 pages.

No Author, "OpenMVG (open Multiple View Geometry)", https://web.archive.org/web/20220120115341/https://github.com/openMVG/openMVG, Jan. 20, 2022, 3 pages.

* cited by examiner

AUGMENTING DATA USED TO TRAIN COMPUTER VISION MODEL WITH IMAGES OF DIFFERENT PERSPECTIVES

TECHNICAL FIELD

The present disclosure relates generally to computer vision, and more particularly to improving the accuracy of computer vision models by incorporating appropriate images of different perspectives of the object in the training data that were not previously available in the original training data.

BACKGROUND

Computer vision is an interdisciplinary scientific field that deals with how computers can gain high-level understanding from digital images or videos. From the perspective of engineering, it seeks to understand and automate tasks that the human visual system can do.

Computer vision tasks include methods for acquiring, processing, analyzing and understanding digital images, and extraction of high-dimensional data from the real world in order to produce numerical or symbolic information, e.g., in the forms of decisions. Understanding in this context means the transformation of visual images (the input of the retina) into descriptions of the world that make sense to thought processes and can elicit appropriate action. This image understanding can be seen as the disentangling of symbolic information from image data using models ("vision models" or "computer vision models") constructed with the aid of geometry, physics, statistics, and learning theory.

Computer vision models are designed to translate visual data based on features and contextual information identified during training. This enables models to interpret images and video and apply those interpretations to predictive or decision making tasks.

Such computer vision models are trained to answer questions about an image, such as what objects are in the image, where are those objects in the image, what are the key points on an object, etc. Such training involves a dataset, which may include different images of the same object (e.g., pair of shoes). While such a dataset may include images of several perspectives of the object, there may be some perspectives of the object that were not included in the dataset. As a result, the accuracy of the vision model trained by this dataset may be relatively low.

Consequently, there have been various techniques to identify the appropriate data to augment the dataset used to train the computer vision model in order to improve the accuracy of the vision model.

For example, images may be geometrically transformed, such as via flipping the images vertically or horizontally, rotation, cropping, scaling, etc. The dataset may then be augmented with such new images.

In another examples, color in the images may be transformed, such as via color conversion, adding noise, coarse dropout, etc. The dataset may then be augmented with such transformed images.

In a further example, features from different images may be mixed to generate new images. The dataset may then be augmented with such new images.

Unfortunately, such transformations are based on the contents of the images as opposed to different perspectives of the object. As a result, the dataset used to train the vision model may still not include images from certain perspectives thereby diminishing the accuracy of the vision model, such as being able to identify objects in the image, etc.

Consequently, there is not currently a means for effectively augmenting the dataset used to train the vision model, such as with images of different perspectives of the object that were not previously available in the original training data.

SUMMARY

In one embodiment of the present disclosure, a computer-implemented method for improving accuracy of a vision model comprises receiving images of an object with a first set of perspectives from a dataset used to train the vision model. The method further comprises generating a three-dimensional model of the object using the images of the object from the dataset. The method additionally comprises obtaining images of the object with a second set of perspectives using the three-dimensional model of the object. Furthermore, the method comprises augmenting the dataset with the images of the object with the second set of perspectives.

In this manner, the dataset used to train the vision model includes a greater number of perspectives of the object thereby improving the accuracy of the vision model, such as being able to identify objects in the image, etc.

In another embodiment of the present disclosure, a computer program product for improving accuracy of a vision model, where the computer program product comprises one or more computer readable storage mediums having program code embodied therewith, where the program code comprising programming instructions for receiving images of an object with a first set of perspectives from a dataset used to train the vision model. The program code further comprises the programming instructions for generating a three-dimensional model of the object using the images of the object from the dataset. The program code additionally comprises the programming instructions for obtaining images of the object with a second set of perspectives using the three-dimensional model of the object. Furthermore, the program code comprises the programming instructions for augmenting the dataset with the images of the object with the second set of perspectives.

In this manner, the dataset used to train the vision model includes a greater number of perspectives of the object thereby improving the accuracy of the vision model, such as being able to identify objects in the image, etc.

In a further embodiment of the present disclosure, a system comprises a memory for storing a computer program for improving accuracy of a vision model and a processor connected to the memory. The processor is configured to execute program instructions of the computer program comprising receiving images of an object with a first set of perspectives from a dataset used to train the vision model. The processor is further configured to execute the program instructions of the computer program comprising generating a three-dimensional model of the object using the images of the object from the dataset. The processor is additionally configured to execute the program instructions of the computer program comprising obtaining images of the object with a second set of perspectives using the three-dimensional model of the object. Furthermore, the processor is configured to execute the program instructions of the computer program comprising augmenting the dataset with the images of the object with the second set of perspectives.

In this manner, the dataset used to train the vision model includes a greater number of perspectives of the object thereby improving the accuracy of the vision model, such as being able to identify objects in the image, etc.

The foregoing has outlined rather generally the features and technical advantages of one or more embodiments of the present disclosure in order that the detailed description of the present disclosure that follows may be better understood. Additional features and advantages of the present disclosure will be described hereinafter which may form the subject of the claims of the present disclosure.

BRIEF DESCRIPTION OF THE DRAWINGS

A better understanding of the present disclosure can be obtained when the following detailed description is considered in conjunction with the following drawings, in which.

DETAILED DESCRIPTION

Figure 1:
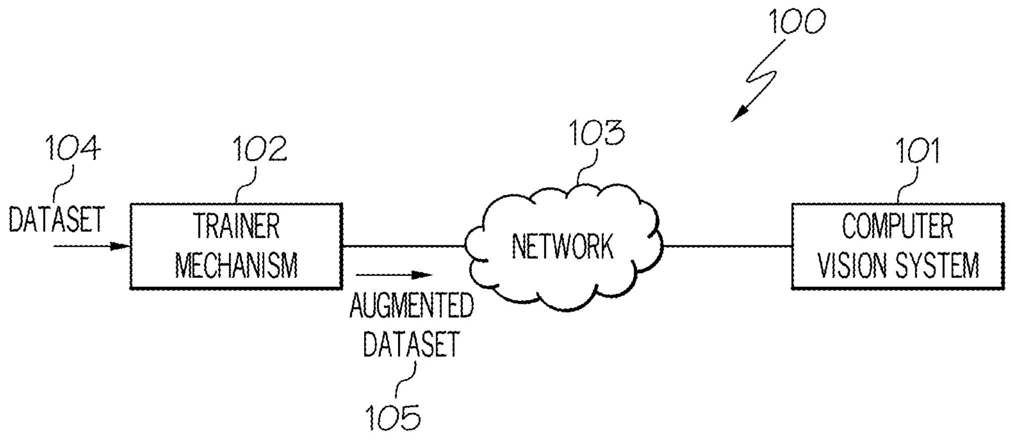
FIG. 1 illustrates a communication system for practicing the principles of the present disclosure in accordance with an embodiment of the present disclosure.

As stated in the Background section, computer vision models are designed to translate visual data based on features and contextual information identified during training. This enables models to interpret images and video and apply those interpretations to predictive or decision making tasks.

Such computer vision models are trained to answer questions about an image, such as what objects are in the image, where are those objects in the image, what are the key points on an object, etc. Such training involves a dataset, which may include different images of the same object (e.g., pair of shoes). While such a dataset may include images of several perspectives of the object, there may be some perspectives of the object that were not included in the dataset. As a result, the accuracy of the vision model trained by this dataset may be relatively low.

Consequently, there have been various techniques to identify the appropriate data to augment the dataset used to train the computer vision model in order to improve the accuracy of the vision model.

For example, images may be geometrically transformed, such as via flipping the images vertically or horizontally, rotation, cropping, scaling, etc. The dataset may then be augmented with such new images.

In another examples, color in the images may be transformed, such as via color conversion, adding noise, coarse dropout, etc. The dataset may then be augmented with such transformed images.

In a further example, features from different images may be mixed to generate new images. The dataset may then be augmented with such new images.

Unfortunately, such transformations are based on the contents of the images as opposed to different perspectives of the object. As a result, the dataset used to train the vision model may still not include images from certain perspectives thereby diminishing the accuracy of the vision model, such as being able to identify objects in the image, etc.

Consequently, there is not currently a means for effectively augmenting the dataset used to train the vision model, such as with images of different perspectives of the object that were not previously available in the original training data.

The embodiments of the present disclosure provide a means for augmenting the data used to train the vision model with images of different perspectives of the object that were not previously available in the original training data by generating a three-dimensional model of the object and obtaining images of the object with different perspectives using the three-dimensional model of the object. The dataset (original training data) may then be augmented with such images. A more detailed description of these and other features will be provided below.

In some embodiments of the present disclosure, the present disclosure comprises a computer-implemented method, system and computer program product for improving the accuracy of a vision model. In one embodiment of the present disclosure, images of an object with a first set of perspectives are received from a dataset used to train the vision model. A three-dimensional model of the object is then generated using the images of the object from the dataset. The present disclosure utilizes different techniques for generating such a three-dimensional model of the object based on whether the object is classified as a regular geometry object or a non-regular geometry object. A "regular geometry object," as used herein, refers to an object in an image in which all sides are equal and the inside angles are equal. A "non-regular geometry object," as used herein, refers to an object in an image in which not all the sides are equal and/or not all the inside angles are equal. Using the three-dimensional model of the object, images of the object with a second set of perspectives are obtained. For example, the second set of perspectives may include different perspectives than the perspectives of the object from the images contained in the original training data. For instance, such different perspectives may be obtained based on different views of the object provided by the three-dimensional model of the object than the views of the object provided by the images contained in the original training data. The dataset used to train the vision model may then be augmented with such images of the object with a second set of perspectives. In this manner, the dataset used to train the vision model includes a greater number of perspectives of the object thereby improving the accuracy of the vision model, such as being able to identify objects in the image, etc.

In the following description, numerous specific details are set forth to provide a thorough understanding of the present disclosure. However, it will be apparent to those skilled in the art that the present disclosure may be practiced without such specific details. In other instances, well-known circuits have been shown in block diagram form in order not to obscure the present disclosure in unnecessary detail. For the most part, details considering timing considerations and the like have been omitted inasmuch as such details are not necessary to obtain a complete understanding of the present disclosure and are within the skills of persons of ordinary skill in the relevant art.

Referring now to the Figures in detail, FIG. 1 illustrates an embodiment of the present disclosure of a communication system 100 for practicing the principles of the present disclosure. Communication system 100 includes a computer vision system 101 configured to derive meaningful information from digital images, videos and other visual inputs using a vision model trained by a trainer mechanism 102. In one embodiment, trainer mechanism 102 and computer vision system 101 are connected via a network 103.

In one embodiment, trainer mechanism 102 receives images of an object (e.g., dice) with a set of perspectives (e.g., top, bottom, left-side, right-side) contained within a dataset 104 used to train the vision model of computer vision system 101. Such a dataset 104 may be deficient in terms of training the vision model by not including certain perspectives of the object. As a result, trainer mechanism 102 is configured to augment the dataset (augmented dataset 105) with images of the object with an additional set of perspectives (e.g., top-left, bottom-right, zoomed-in view of top center) that were not previously available in the original training data (dataset 104). As a result of augmenting dataset 104 (augmented dataset 105) with such images of the object with the additional set of perspectives, the accuracy of the vision model of computer vision system 101 will be improved, such as being better able to identify objects in the image. A more detailed description of these and other features is provided below.

Furthermore, a description of the software components of trainer mechanism 102 is provided below in connection with FIG. 2 and a description of the hardware configuration of trainer mechanism 102 is provided further below in connection with FIG. 8.

Network 103 may be, for example, a local area network, a wide area network, a wireless wide area network, a circuit-switched telephone network, a Global System for Mobile Communications (GSM) network, a Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present disclosure.

System 100 is not to be limited in scope to any one particular network architecture. System 100 may include any number of computer vision systems 101, trainer mechanisms 102 and networks 103.

A discussion regarding the software components used by trainer mechanism 102 to augment the dataset used to train the vision model with images of the object containing a different set of perspectives is provided below in connection with FIG. 2.

Figure 2:
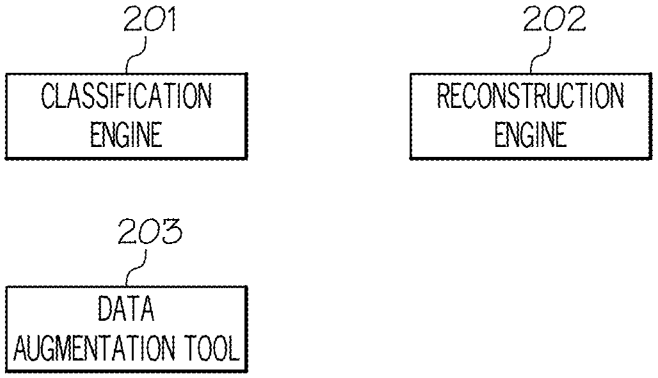
FIG. 2 is a diagram of the software components of the trainer mechanism used to augment the dataset used to train the vision model with images of the object containing a different set of perspectives in accordance with an embodiment of the present disclosure.

FIG. 2 is a diagram of the software components of trainer mechanism 102 used to augment the dataset used to train the vision model with images of the object containing a different set of perspectives in accordance with an embodiment of the present disclosure.

Referring to FIG. 2, in conjunction with FIG. 1, trainer mechanism 102 includes a classification engine 201 configured to classify an image within the dataset (e.g., dataset 104) as being a regular geometry object or a non-regular geometry object. A "regular geometry object," as used herein, refers to an object in an image in which all sides are equal and the inside angles are equal. A "non-regular geometry object," as used herein, refers to an object in an image in which not all the sides are equal and/or not all the inside angles are equal. Such a classification is used herein by trainer mechanism 102 in order to determine which method to generate a three-dimensional (3D) model of the object using the images of the object within dataset 104 as discussed further below.

In one embodiment, classification engine 201 trains a classification model to recognize regular and non-regular geometry objects based on features.

In one embodiment, classification engine 201 uses a machine learning algorithm (e.g., supervised learning) to build the classification model to classify an object within an image as being a regular geometry object or a non-regular geometry object based on sample data consisting of labeled images containing the features (e.g., lines, contours, angles) of regular geometry objects and non-regular geometry objects. "Labeled images," as used herein, refer to images that are identified as containing the features of either regular geometry objects or non-regular geometry objects. In one embodiment, such images may be labelled by an expert.

Such sample data (dataset) is referred to herein as the "training data," which is used by the machine learning algorithm to make predictions or decisions as to the classification of the objects within the images. The algorithm iteratively makes predictions on the training data as to the classification of the objects within the images until the predictions achieve the desired accuracy. In one embodiment, such a desired accuracy is determined based on the classification of the object predicted by an expert based on the features of the labeled images. Examples of such learning algorithms include nearest neighbor, Naïve Bayes, decision trees, linear regression, support vector machines and neural networks.

For objects classified as regular geometry objects, in one embodiment, an expert may label the image to designate the type of object (e.g., "Fisher-Price® music box") within the image. Such labels may be used by trainer mechanism 102 to group those images that are assigned the same label as discussed below in connection with generating a three-dimensional model of an object classified as being a regular geometry object.

In one embodiment, the images in dataset 104 are previously labeled by an expert to designate the type of object (e.g., "Fisher-Price® music box") within the image prior to having such objects be classified as being a regular geometry object or a non-regular geometry object.

In one embodiment, after training the classification model to classify an object within an image as being a regular geometry object or a non-regular geometry based on features, classification engine 201 classifies an object of an image as a regular geometry object or a non-regular geometry using the trained classification model as discussed below.

In one embodiment, classification engine 201 receives an image of an object, such as an image from dataset 104. In one embodiment, a saliency map of the object is generated based on the received image. A "saliency map," as used herein, is an image that highlights the region on which people's eyes focus first. The goal of a saliency map is to reflect the degree of importance of a pixel to the human visual system, such as computer vision system 101.

In one embodiment, a saliency map of the object in the received image is generated by extracting features (e.g., lines, contours, angles) from the image. These processed images are used to create Gaussian pyramids, which are used to create feature maps. The saliency map may then be created by taking the mean of all the feature maps.

In one embodiment, a saliency map of the object in the received image is generated using an algorithm, such as Vanilla Gradient, as well as static saliency detection algorithms, such as spectral residual and fine grained implemented in OpenCV®.

Figure 3:
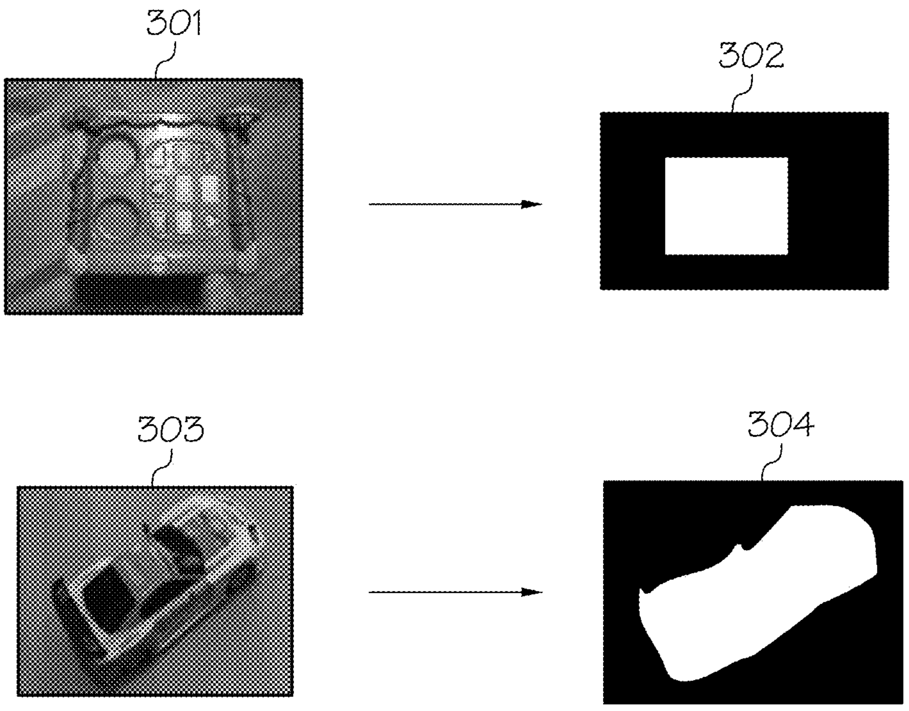
FIG. 3 illustrates a saliency map of an object in accordance with an embodiment of the present disclosure.

An example of a saliency map of an object that is generated from an image of the object is shown in FIG. 3. Referring to FIG. 3, FIG. 3 illustrates a saliency map of an object in accordance with an embodiment of the present disclosure.

As shown in FIG. 3, object 301 with a square shaped outline has a corresponding saliency map 302 that depicts such features. In contrast, object 303, which corresponds to a model car, has a corresponding saliency map 304 that depicts an outline of the model car.

Returning to FIG. 2, in conjunction with FIGS. 1 and 3, after generating such a saliency map of an object, the features (e.g., lines, contours, angles) of the saliency map are extracted. Such features may be extracted using various algorithms, such as the GrabCut algorithm, the SaliencyCut algorithm, etc.

In one embodiment, classification engine 201 classifies an object in an image of dataset 104 as being a regular geometry object or a non-regular geometry object based on such extracted features using the trained classification model. Such features are used by the trained classification model to classify the object of the image as being either a regular geometry object or a non-regular geometry object as discussed above. For example, using the extracted features of saliency map 302, object 301 would be classified as a regular geometry object. In another example, using the extracted features of saliency map 304, object 303 would be classified as a non-regular geometry object.

Upon classifying an object of an image as either a regular geometry object or a non-regular geometry object, the associated image (and other similar images) will then be used to generate a three-dimensional model of the object as discussed below. In particular, based on whether the object of the image is classified as either a regular geometry object or a non-regular geometry object, a different technique is used to generate a three-dimensional model of the object as discussed below.

For objects that are classified as a regular geometry object, the reconstruction engine 202 of trainer mechanism 102 is configured to generate a three-dimensional model of the object using images of the object from dataset 104 as discussed below.

In one embodiment, reconstruction engine 202 groups images of dataset 104 by assigned labels (e.g., "Fisher-Price® music box"). For example, those images that are labeled "Fisher-Price® music box" would be grouped together.

In one embodiment, if there is only a single image assigned by a particular label, then the features of the image will be extracted which will be clustered to obtain a subgroup thereby forming multiple images within a group. In one embodiment, such features will be extracted from the image using various software tools, such as Feature Extraction Software from Agilent®, Marvin, FETEX, etc. Such features may be clustered into a subgroup, such as via various clustering methods, such as portioning-based clustering (e.g., k-means clustering), hierarchical-based clustering (e.g., clustering using representatives (CURE) and balanced iterative reducing clustering and using hierarchies (BIRCH)), density-based clustering (e.g., density-based spatial clustering of applications with noise (DBSCAN)), grid-based clustering (e.g., statistical information grid (STING) and wave cluster), and model-based clustering (e.g., gaussian mixture model (GMM)).

In one embodiment, reconstruction engine 202 instructs classification engine 201 to generate a saliency model of the object using an image of the grouped images of dataset 104 as discussed above.

After generating the saliency model of the object, reconstruction engine 202 extracts an outline of the object based on the saliency map. In one embodiment, such an outline may be extracted based on outlining the shape of the object shown on the saliency map. In one embodiment, various software tools may be used by reconstruction engine 202 to extract such an outline, such as, but not limited to, XnSketch, Rapidresizer, Snapstouch, etc.

Reconstruction engine 202 may then map the object outline to a geometry shape based on matching the object outline to the geometry shape in a library of geometry shapes. Examples of such libraries include, but not limited to, Flatten-js, Geometric, Euclid.ts, ts-2d-geometry, OpenLayers Geometry, Turf.js, etc. In one embodiment, such a library of geometry shapes may include shapes (e.g., regular solid with six square faces) along with the corresponding type of geometry shape (e.g., cube, circle, triangle, square, rectangle, cuboid, sphere, cone, cylinder, etc.). Upon matching the object outline with a geometry shape (e.g., regular solid with six square faces) stored in the library within a threshold degree of similarity, which may be user-designated, reconstruction engine 202 identifies the geometry shape (e.g., cube) for both this image and the other images in the group of images. In one embodiment, such a library of geometry shapes is stored in a storage device (e.g., memory, disk unit) of trainer mechanism 102.

In one embodiment, reconstruction engine 202 matches the object outline with shapes in the library of geometry shapes using various software tools, including, but not limited to, CurvSurf, SegMatch, etc.

In one embodiment, reconstruction engine 202 uses a pattern matching algorithm that uses the pixel intensity information as the primary feature for matching. As an alternative, reconstruction engine 202 uses boundary edges to characterize the shape of the extracted outline of the object and then uses this characterization to search for similar shapes. In one embodiment, reconstruction engine 202 utilizes Vision Assistant Express for geometric matching.

In one embodiment, reconstruction engine 202 defines a surface texture of the object using texture mapping, where such texture mapping is performed using a pre-defined texture method for the geometry shape of the object, including using other images of the object from the grouped images of the dataset. "Texture mapping," as used herein, refers to the application of patterns or image to three-dimensional graphics to enhance the realism of their surfaces. In one embodiment, reconstruction engine 202 utilizes a data structure that contains a list of pre-defined texture methods for an associated geometry shape. For example, for a cube, the texture method to be utilized is PaintCube using the other images in the same group to attach to the different sides of the cube shaped object. In one embodiment, such a data structure is populated by an expert and stored in a storage device (e.g., memory, disk unit) of trainer mechanism 102. In one embodiment, reconstruction engine 202 utilizes a shape-aware texture-mapping tool, such as Autodesk® 3ds Max, to apply the appropriate texture mapping to the identified geometric shape.

In one embodiment, reconstruction engine 202 validates the surface texture using texture projection to form a projection image(s). "Texture projection," as used herein, refers to a method of texture mapping that allows a textured image to be projected onto a scene as if by a slide projector. Reconstruction engine 202 utilizes various software tools for performing texture projection including, but not limited to, Vectorworks®, SketchUp®, etc. In one embodiment, reconstruction engine 202 utilizes the mvs-texrecon algorithm to execute the texture projection.

Furthermore, in one embodiment, reconstruction engine 202 determines whether the projection image corresponds to the ground truth of the image within a threshold degree of similarity, which may be user-designated. The "ground truth," as used herein, refers to information that is known to be real or true, provided by direct observation and measurement. In one embodiment, the ground truth of an image is obtained by reconstruction engine 202 using the software tool Image.J Such a ground truth image is compared to the projection image by reading the images and then reshaping them into a single row vector. The single row vectors for the ground truth image and the projection image can then be compared. In one embodiment, the similarity is based on the closeness of the values of the elements of these vectors.

In one embodiment, reconstruction engine 202 utilizes Image Similarity API from DeepAI® to compare two images and returns a value that informs how visually similar they are. The lower the score, the more contextually similar the two images are with a score of "0" being identical. If the score is below a threshold number, then it is deemed that the projection image corresponds to the ground truth of the image within the threshold degree of similarity.

If the projection image(s) do not correspond to the ground truth image within a threshold degree of similarity, then the surface texture is adjusted by reconstruction engine 202. In one embodiment, such surface texture is adjusted by modifying the texture properties, such as inverting the texture material along a particular axis, modifying the mapping type (e.g., spherical mapping, planar mapping), changing the material size, etc. In one embodiment, such modifications are randomly implemented. In one embodiment, the surface texture is adjusted by reconstruction engine 202 as discussed above using various software tools including, but not limited to, Autodesk® 3ds Max, Sketchup®, etc.

If, however, the projection image does correspond to the ground truth image within a threshold degree of similarity, then the surface texture is selected to be used for the three-dimensional model of the object. Reconstruction engine 202 then generates the three-dimensional model of the object using the selected surface texture.

For objects that are classified as a non-regular geometry object, reconstruction engine 202 of trainer mechanism 102 is configured to generate a three-dimensional model of the object using images of the object from dataset 104 as discussed below.

In one embodiment, reconstruction engine 202 extracts camera intrinsic parameters from the images of the object from dataset 104, such as the focus, width and height. In one embodiment, such parameters may be extracted in the format of a matrix (e.g., f;0;ppx;0;f;ppy;0;0;1), such as a camera intrinsic matrix.

In one embodiment, reconstruction engine 202 extracts camera intrinsic parameters from the images of the object from dataset 104 using various software tools, including, but not limited to, CamChecker.

Furthermore, in one embodiment, reconstruction engine 202 detects the features of the images of the object from dataset 104 using scale invariant feature transform (SIFT).

SIFT, as used herein, refers to an algorithm used to detect and describe local features in digital images. In one embodiment, SIFT locates certain keypoints and then furnishes them with quantitative information ("descriptors") which can, for example, be used for object recognition.

In one embodiment, features are detected by reconstruction engine 202 using SIFT by using the maxima from a difference-of-Gaussians pyramid as the features. In one embodiment, a dominant gradient direction is found. To make it rotation-invariant, the descriptor is rotated to fit this orientation.

In one embodiment, features of the images of the object from dataset 104 are detected using speeded-up robust features (SURF). In SURF, the difference-of-Gaussians pyramid is replaced with a Hessian matrix-based blob detector. Also, instead of evaluating the gradient histograms. SURF computes for the sums of gradient components and their sums of their absolute values.

Additionally, in one embodiment, reconstruction engine 202 identifies the matches of the features in the images.

In one embodiment, the SIFT features extracted from the images are matched against each other to find the k nearest-neighbors for each feature. These correspondences are then used to find m candidate matching images for each image.

In one embodiment, features can be extracted from each of the images of the object using SIFT to provide a "feature description" of the object for that image. The extracted features from each of these images may then be compared with one another to identify matching features based on the Euclidean distance of their feature vectors. From the full set of matches, subsets of keypoints that agree on the object and its location, scale, and orientation in the image are identified to filter out good matches.

In one embodiment, reconstruction engine 202 matches the features detected from the images using a matching algorithm that tracks features from one image to another, such as the Lucas-Kanade tracker.

In one embodiment, to address the possibility of matching features incorrectly, such incorrect matches are filtered. In one embodiment, reconstruction engine 202 uses an algorithm (e.g., random sample consensus (RANSAC)) to remove such outlier correspondences. In one embodiment, RANSAC is used to solve the location determination problem, where the objective is to determine the points in space that project onto an image into a set of landmarks with known locations.

Furthermore, in one embodiment, reconstruction engine 202 generates a point cloud representing a three-dimensional model of the object using the extracted intrinsic parameters and the identified matched features. A "point cloud," as used herein, refers to a set of data points in space. In one embodiment, such points represent a three-dimensional shape or object. In one embodiment, each point position has its set of cartesian coordinates (x, y, z).

As discussed above, reconstruction engine 202 matches the features detected from the images, such as by using a matching algorithm that tracks features from one image to another, such as the Lucas-Kanade tracker. In one embodiment, the feature trajectories over time as well as the extracted camera intrinsic parameters are then used to reconstruct their three-dimensional positions and motion. An alternative is given by so-called direct approaches, where geometric information (three-dimensional structure and motion) is directly estimated from the images without intermediate abstraction to features or corners.

In one embodiment, reconstruction engine 202 constructs a three-dimensional structure from the two-dimensional images of the object of dataset 104 by using the structure from motion imaging technique. "Structure from motion," as used herein, refers to a photogrammetric range imaging technique for estimating three-dimensional structures from two-dimensional image sequences that may be coupled with local motion signals.

In one embodiment, reconstruction engine 202 constructs a three-dimensional structure ("global structure") using the structure from motion imaging technique by estimating the position and orientation of each image in a common three-dimensional coordinate frame. The final output is a point cloud of a three-dimensional object. For example, the feature trajectories over time as well as the extracted camera intrinsic parameters are used to construct a three-dimensional structure from a set of two-dimensional images using the structure from motion approach as illustrated in FIG. 4.

Figure 4:
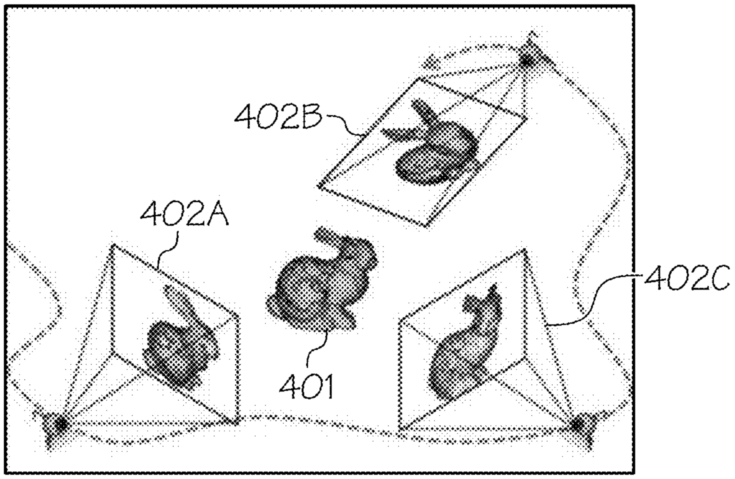
FIG. 4 illustrates constructing a three-dimensional structure using the structure from motion algorithm by estimating the position and orientation of each image in a common three-dimensional coordinate frame using the feature trajectories over time as well as the extracted camera intrinsic parameters in accordance with an embodiment of the present disclosure.

Referring to FIG. 4, FIG. 4 illustrates constructing a three-dimensional structure using the structure from motion algorithm by estimating the position and orientation of each image in a common three-dimensional coordinate frame using the feature trajectories over time as well as the extracted camera intrinsic parameters in accordance with an embodiment of the present disclosure.

As shown in FIG. 4, three-dimensional structure 401 is constructed using the structure from motion imaging technique by estimating the position and orientation of each image 402A-402C. The position and orientation of each image 402A-402C is based on these feature trajectories and extracted camera intrinsic parameters. By placing such images 402A-402C at different locations and orientations, such two-dimensional images are placed in "motion" thereby being able to construct a three-dimensional structure that takes into consideration the different perspectives of the object.

Figure 5:
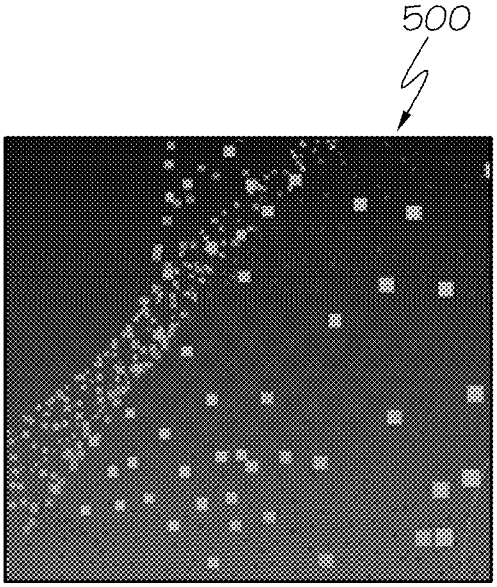
FIG. 5 illustrates a point cloud of a three-dimensional object in accordance with an embodiment of the present disclosure.

In one embodiment, the set of the views from these images 402A-402C using the structure from motion imaging technique utilizes point correspondences across these images called tracks. In one embodiment, such tracks are computed from pairwise point correspondences. In one embodiment, the imageviewset function from MathWorks® may be used to manage the pairwise correspondences and locate the tracks. In one embodiment, each track corresponds to a three-dimensional point. In one embodiment, to compute the three-dimensional points from the tracks, the triangulateMultiview function from MathWorks® may be used to compute the three-dimensional points. Such three-dimensional points may be collected to form the point cloud of the three-dimensional object as shown in FIG. 5. FIG. 5 illustrates a point cloud 500 of a three-dimensional object in accordance with an embodiment of the present disclosure.

Returning to FIG. 2, in conjunction with FIGS. 1 and 3-5, reconstruction engine 202 determines whether the density of points in the point cloud, such as point cloud 500, in a bounding box exceeds a threshold number, which may be user-designated. A "bounding box" or "bounding box area," as used herein, refers to an imaginary area that serves as a point of reference for object detection.

If the density of points in the point cloud does not exceed the threshold number, then reconstruction engine 202 detects the features of the images within a bounding box area using dense scale invariant feature transform.

"Dense scale invariant feature transform," as used herein, refers to the implementation of a dense version of SIFT ("DSIFT"). In DSIFT, the SIFT descriptor is applied at dense grids. That is, the SIFT descriptor is computed over dense grids in the image domain.

As discussed above, a "bounding box" or "bounding box area," as used herein, refers to an imaginary area that serves as a point of reference for object detection. An illustration of a bounding box area used in connection with DSIFT is shown in FIG. 6.

Figure 6:
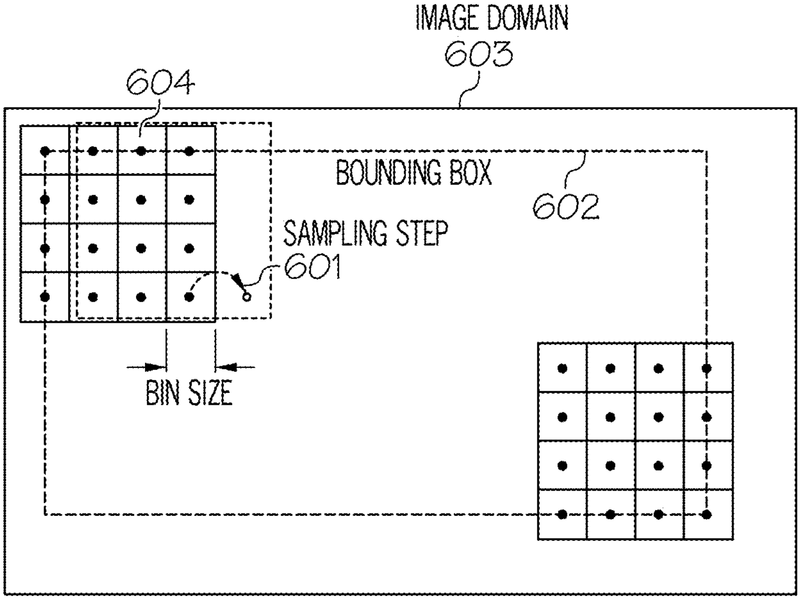
FIG. 6 illustrates detecting features of the images within a bounding box of an image domain using a dense version of SIFT (scale invariant feature transform) in accordance with an embodiment of the present disclosure.

FIG. 6 illustrates detecting features of the images within a bound box area using DSIFT in accordance with an embodiment of the present disclosure.

Referring to FIG. 6, in one embodiment, the feature frames (keypoints) are indirectly specified by the sampling steps 601 (e.g., vl_dsift_set_steps algorithm) and the sampling bounds (e.g., vl_dsift_set_bounds algorithm) within a bounding box 602 of image domain 603. The descriptor geometry (number and size of the spatial bins and number of orientation bins) can be customized (e.g., vl_dsift_set_geometry algorithm, VlDsiftDescriptorGeometry algorithm).

By default, SIFT uses a Gaussian windowing function that discounts contributions of gradients further away from the descriptor centers. In one embodiment, this function can be changed to a flat window by invoking the vl_dsift_set_flat_window algorithm. In such an embodiment, gradients are accumulated using only bilinear interpolation, but instead of being reweighted by a Gaussian window, they are all weighted equally. However, after gradients have been accumulated into a spatial bin, the whole bin is reweighted by the average of the Gaussian window over the spatial support of that bin. This "approximation" substantially improves speed with little or no loss of performance in applications.

Keypoints are sampled in such a way that the centers of the spatial bins 604 are at integer coordinates within the image boundaries. For instance, the top-left bin of the top-left descriptor is centered on the pixel (0,0). In one embodiment, the vl_dsift_set_bounds algorithm can be used to further restrict sampling to the keypoints in an image.

Additionally, in one embodiment, reconstruction engine 202 identifies the matches of these features in the images.

As discussed above, in one embodiment, the features detected from these images are matched against each other to find the k nearest-neighbors for each feature. These correspondences are then used to find m candidate matching images for each image.

In one embodiment, the detected features from each of these images may be compared with one another to identify matching features based on the Euclidean distance of their feature vectors. From the full set of matches, subsets of keypoints that agree on the object and its location, scale, and orientation in the image are identified to filter out good matches.

In one embodiment, reconstruction engine 202 matches the features detected from the images using a matching algorithm that tracks features from one image to another, such as the Lucas-Kanade tracker.

In one embodiment, to address the possibility of matching features incorrectly, such incorrect matches are filtered. In one embodiment, reconstruction engine 202 uses an algorithm (e.g., random sample consensus (RANSAC)) to remove such outlier correspondences. In one embodiment, RANSAC is used to solve the location determination problem, where the objective is to determine the points in space that project onto an image into a set of landmarks with known locations.

Upon identifying matches of such features in these images, reconstruction engine 202 may generate a new point cloud, such as point cloud 500, as discussed above.

If, however, the density of points in the point cloud, such as point cloud 500, exceeds the threshold number, then reconstruction engine 202 creates a mesh object from the point cloud.

A "mesh object," as used herein, refers to a shape composed of triangles and vertices. In one embodiment, the point cloud, such as point cloud 500, stores the locations for points; whereas, the mesh object converts those points into triangles and vertices. An illustration of a mesh object is shown in FIG. 7.

Figure 7:
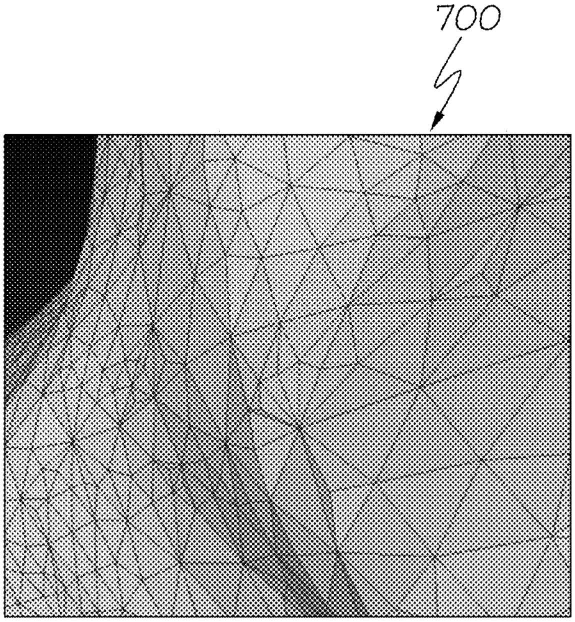
FIG. 7 illustrates a mesh object formed from a point cloud in accordance with an embodiment of the present disclosure.

FIG. 7 illustrates a mesh object 700 formed from a point cloud, such as point cloud 500, in accordance with an embodiment of the present disclosure.

Returning to FIG. 2, in conjunction with FIGS. 1 and 3-7, in one embodiment, reconstruction engine 202 creates the mesh object, such as mesh object 700, from the point cloud, such as point cloud 500, using various software tools, including, but not limited to, Pointfuse®, MeshLab, etc.

In one embodiment, reconstruction engine 202 creates the mesh object, such as mesh object 700, from the point cloud, such as point cloud 500, using one of the following meshing algorithms: Ball-Pivoting Algorithm and Poisson Reconstruction.

In one embodiment, reconstruction engine 202 creates the mesh object, such as mesh object 700, from the point cloud, such as point cloud 500, using the multi-view environment (an implementation of a complete end-to-end pipeline for image-based geometry reconstruction).

Upon creating the mesh object from the point cloud, in one embodiment, reconstruction engine 202 textures the mesh object using texture projection thereby forming the three-dimensional model of the object. "Texture projection," as discussed above, refers to a method of texture mapping that allows a textured image to be projected onto a scene as if by a slide projector. Reconstruction engine 202 utilizes various software tools for performing texture projection including, but not limited to, Vectorworks®, SketchUp®, etc.

Furthermore, in one embodiment, trainer mechanism 102 includes data augmentation tool 203 configured to augment dataset 104 with images of the object with a second set of perspectives (forming dataset 105).

In one embodiment, using the three-dimensional model of the object generated by reconstruction engine 202, data augmentation tool 203 obtains images of the object with a second set of perspectives. For example, data augmentation tool 203 selects additional views from the views of the object previously shown in the images of dataset 104. For instance, the images from dataset 104 may show the top, left and sides of an object. Data augmentation tool 203 may then select views from the top-left, bottom-right, etc. of the three-dimensional model of the object thereby providing different perspectives of the object. Such different views may be captured via a screenshot or via various software tools, such as Agisoft Metashape®. Dataset 104 may then be augmented with these images forming an augmented dataset 105 that includes a greater number of perspectives of the object. By augmenting dataset 104 with images of different perspectives of the object that were not previously available in the original training data (dataset 104), a vision model may be more effectively trained thereby improving the accuracy of the vision model, such as being better able to identify objects in the image, etc.

In one embodiment, data augmentation tool 203 may also obtain images that are similar to the views of the images contained in dataset 104 but with a different perspective, such as being zoomed in/zoomed out. In one embodiment, data augmentation tool 203 performs a circle scope of the three-dimensional model of the object for similar current views (similar views of the images contained in dataset 104, such as a view of the center of the object). A "circle scope," as used herein, refers to the area of the three-dimensional model of the object that is formed by performing a circle around the three-dimensional model. Additional perspectives that are similar to the current views (views of the images of dataset 104) may then be generated by data augmentation tool 203 by randomly selecting views from the circle scope of the three-dimensional model of the object. Such different perspectives may be captured via a screenshot or via various software tools, such as Agisoft Metashape®. Dataset 104 may then be augmented with these images forming an augmented dataset 105 that includes a greater number of perspectives of the object. By augmenting dataset 104 with images of different perspectives of the object that were not previously available in the original training data (dataset 104), a vision model may be more effectively trained thereby improving the accuracy of the vision model, such as being better able to identify objects in the image, etc.

A further description of these and other features is provided below in connection with the discussion of the method for improving the accuracy of a vision model.

Prior to the discussion of the method for improving the accuracy of a vision model, a description of the hardware configuration of trainer mechanism 102 (FIG. 1) is provided below in connection with FIG. 8.

Figure 8:
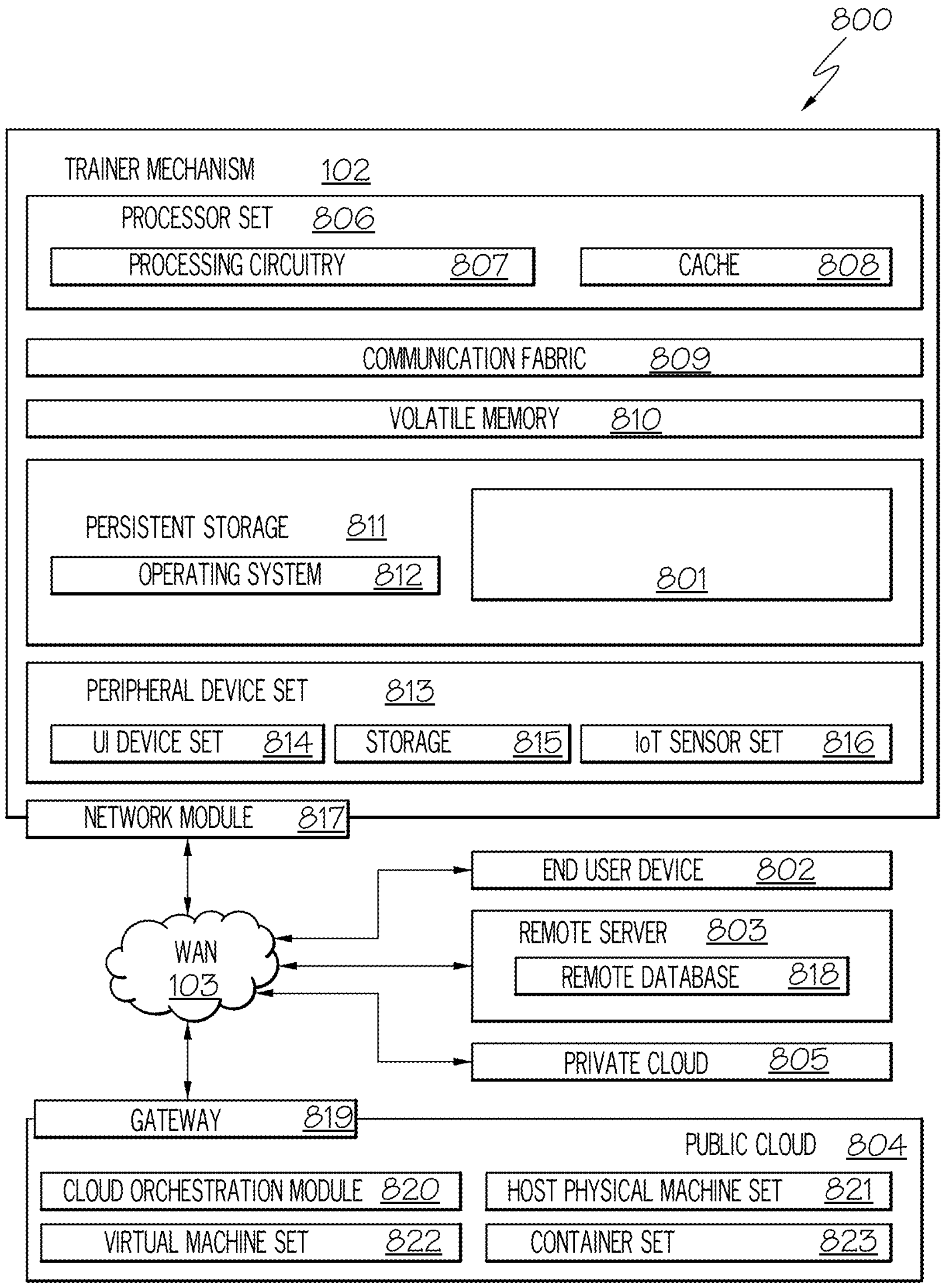
FIG. 8 illustrates an embodiment of the present disclosure of the hardware configuration of the trainer mechanism which is representative of a hardware environment for practicing the present disclosure.

Referring now to FIG. 8, in conjunction with FIG. 1, FIG. 8 illustrates an embodiment of the present disclosure of the hardware configuration of trainer mechanism 102 which is representative of a hardware environment for practicing the present disclosure.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 800 contains an example of an environment for the execution of at least some of the computer code 801 involved in performing the inventive methods, such as improving the accuracy of the vision model. In addition to block 801, computing environment 800 includes, for example, trainer mechanism 102, network 103, such as a wide area network (WAN), end user device (EUD) 802, remote server 803, public cloud 804, and private cloud 805. In this embodiment, trainer mechanism 102 includes processor set 806 (including processing circuitry 807 and cache 808), communication fabric 809, volatile memory 810, persistent storage 811 (including operating system 812 and block 801, as identified above), peripheral device set 813 (including user interface (UI) device set 814, storage 815, and Internet of Things (IoT) sensor set 816), and network module 817. Remote server 803 includes remote database 818. Public cloud 804 includes gateway 819, cloud orchestration module 820, host physical machine set 821, virtual machine set 822, and container set 823.

Trainer mechanism 102 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 818. As is well understood in the art of computer technology, and depending upon the technology, performance of a computer-implemented method may be distributed among multiple computers and/or between multiple locations. On the other hand, in this presentation of computing environment 800, detailed discussion is focused on a single computer, specifically trainer mechanism 102, to keep the presentation as simple as possible. Trainer mechanism 102 may be located in a cloud, even though it is not shown in a cloud in FIG. 8. On the other hand, trainer mechanism 102 is not required to be in a cloud except to any extent as may be affirmatively indicated.

Processor set 806 includes one, or more, computer processors of any type now known or to be developed in the future. Processing circuitry 807 may be distributed over multiple packages, for example, multiple, coordinated integrated circuit chips. Processing circuitry 807 may implement multiple processor threads and/or multiple processor cores. Cache 808 is memory that is located in the processor chip package(s) and is typically used for data or code that should be available for rapid access by the threads or cores running on processor set 806. Cache memories are typically organized into multiple levels depending upon relative proximity to the processing circuitry. Alternatively, some, or all, of the cache for the processor set may be located "off chip." In some computing environments, processor set 806 may be designed for working with qubits and performing quantum computing.

Computer readable program instructions are typically loaded onto trainer mechanism 102 to cause a series of operational steps to be performed by processor set 806 of trainer mechanism 102 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 808 and the other storage media discussed below. The program instructions, and associated data, are accessed by processor set 806 to control and direct performance of the inventive methods. In computing environment 800, at least some of the instructions for performing the inventive methods may be stored in block 801 in persistent storage 811.

Communication fabric 809 is the signal conduction paths that allow the various components of trainer mechanism 102 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 810 is any type of volatile memory now known or to be developed in the future. Examples include dynamic type random access memory (RAM) or static type RAM. Typically, the volatile memory is characterized by random access, but this is not required unless affirmatively indicated. In trainer mechanism 102, the volatile memory 810 is located in a single package and is internal to trainer mechanism 102, but, alternatively or additionally, the volatile memory may be distributed over multiple packages and/or located externally with respect to trainer mechanism 102.

Persistent Storage 811 is any form of non-volatile storage for computers that is now known or to be developed in the future. The non-volatility of this storage means that the stored data is maintained regardless of whether power is being supplied to trainer mechanism 102 and/or directly to persistent storage 811. Persistent storage 811 may be a read only memory (ROM), but typically at least a portion of the persistent storage allows writing of data, deletion of data and re-writing of data. Some familiar forms of persistent storage include magnetic disks and solid state storage devices. Operating system 812 may take several forms, such as various known proprietary operating systems or open source Portable Operating System Interface type operating systems that employ a kernel. The code included in block 801 typically includes at least some of the computer code involved in performing the inventive methods.

Peripheral device set 813 includes the set of peripheral devices of trainer mechanism 102. Data communication connections between the peripheral devices and the other components of trainer mechanism 102 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 814 may include components such as a display screen, speaker, microphone, wearable devices (such as goggles and smart watches), keyboard, mouse, printer, touchpad, game controllers, and haptic devices. Storage 815 is external storage, such as an external hard drive, or insertable storage, such as an SD card. Storage 815 may be persistent and/or volatile. In some embodiments, storage 815 may take the form of a quantum computing storage device for storing data in the form of qubits. In embodiments where trainer mechanism 102 is required to have a large amount of storage (for example, where trainer mechanism 102 locally stores and manages a large database) then this storage may be provided by peripheral storage devices designed for storing very large amounts of data, such as a storage area network (SAN) that is shared by multiple, geographically distributed computers. IoT sensor set 816 is made up of sensors that can be used in Internet of Things applications. For example, one sensor may be a thermometer and another sensor may be a motion detector.

Network module 817 is the collection of computer software, hardware, and firmware that allows trainer mechanism 102 to communicate with other computers through WAN 103. Network module 817 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 817 are performed on the same physical hardware device. In other embodiments (for example, embodiments that utilize software-defined networking (SDN)), the control functions and the forwarding functions of network module 817 are performed on physically separate devices, such that the control functions manage several different network hardware devices. Computer readable program instructions for performing the inventive methods can typically be downloaded to trainer mechanism 102 from an external computer or external storage device through a network adapter card or network interface included in network module 817.

WAN 103 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 802 is any computer system that is used and controlled by an end user (for example, a customer of an enterprise that operates trainer mechanism 102), and may take any of the forms discussed above in connection with trainer mechanism 102. EUD 802 typically receives helpful and useful data from the operations of trainer mechanism 102. For example, in a hypothetical case where trainer mechanism 102 is designed to provide a recommendation to an end user, this recommendation would typically be communicated from network module 817 of trainer mechanism 102 through WAN 103 to EUD 802. In this way, EUD 802 can display, or otherwise present, the recommendation to an end user. In some embodiments, EUD 802 may be a client device, such as thin client, heavy client, mainframe computer, desktop computer and so on.

Remote server 803 is any computer system that serves at least some data and/or functionality to trainer mechanism 102. Remote server 803 may be controlled and used by the same entity that operates trainer mechanism 102. Remote server 803 represents the machine(s) that collect and store helpful and useful data for use by other computers, such as trainer mechanism 102. For example, in a hypothetical case where trainer mechanism 102 is designed and programmed to provide a recommendation based on historical data, then this historical data may be provided to trainer mechanism 102 from remote database 818 of remote server 803.

Public cloud 804 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 804 is performed by the computer hardware and/or software of cloud orchestration module 820. The computing resources provided by public cloud 804 are typically implemented by virtual computing environments that run on various computers making up the computers of host physical machine set 821, which is the universe of physical computers in and/or available to public cloud 804. The virtual computing environments (VCEs) typically take the form of virtual machines from virtual machine set 822 and/or containers from container set 823. It is understood that these VCEs may be stored as images and may be transferred among and between the various physical machine hosts, either as images or after instantiation of the VCE. Cloud orchestration module 820 manages the transfer and storage of images, deploys new instantiations of VCEs and manages active instantiations of VCE deployments. Gateway 819 is the collection of computer software, hardware, and firmware that allows public cloud 804 to communicate through WAN 103.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 805 is similar to public cloud 804, except that the computing resources are only available for use by a single enterprise. While private cloud 805 is depicted as being in communication with WAN 103 in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 804 and private cloud 805 are both part of a larger hybrid cloud.

Block 801 further includes the software components discussed above in connection with FIGS. 2-7 to improve the accuracy of a vision model. In one embodiment, such components may be implemented in hardware. The functions discussed above performed by such components are not generic computer functions. As a result, trainer mechanism 102 is a particular machine that is the result of implementing specific, non-generic computer functions.

In one embodiment, the functionality of such software components of trainer mechanism 102, including the functionality for improving the accuracy of a vision model may be embodied in an application specific integrated circuit.

As stated above, computer vision models are designed to translate visual data based on features and contextual information identified during training. This enables models to interpret images and video and apply those interpretations to predictive or decision making tasks. Such computer vision models are trained to answer questions about an image, such as what objects are in the image, where are those objects in the image, what are the key points on an object, etc. Such training involves a dataset, which may include different images of the same object (e.g., pair of shoes). While such a dataset may include images of several perspectives of the object, there may be some perspectives of the object that were not included in the dataset. As a result, the accuracy of the vision model trained by this dataset may be relatively low. Consequently, there have been various techniques to identify the appropriate data to augment the dataset used to train the computer vision model in order to improve the accuracy of the vision model. For example, images may be geometrically transformed, such as via flipping the images vertically or horizontally, rotation, cropping, scaling, etc. The dataset may then be augmented with such new images. In another examples, color in the images may be transformed, such as via color conversion, adding noise, coarse dropout, etc. The dataset may then be augmented with such transformed images. In a further example, features from different images may be mixed to generate new images. The dataset may then be augmented with such new images. Unfortunately, such transformations are based on the contents of the images as opposed to different perspectives of the object. As a result, the dataset used to train the vision model may still not include images from certain perspectives thereby diminishing the accuracy of the vision model, such as being able to identify objects in the image, etc. Consequently, there is not currently a means for effectively augmenting the dataset used to train the vision model, such as with images of different perspectives of the object that were not previously available in the original training data.

Figure 9:
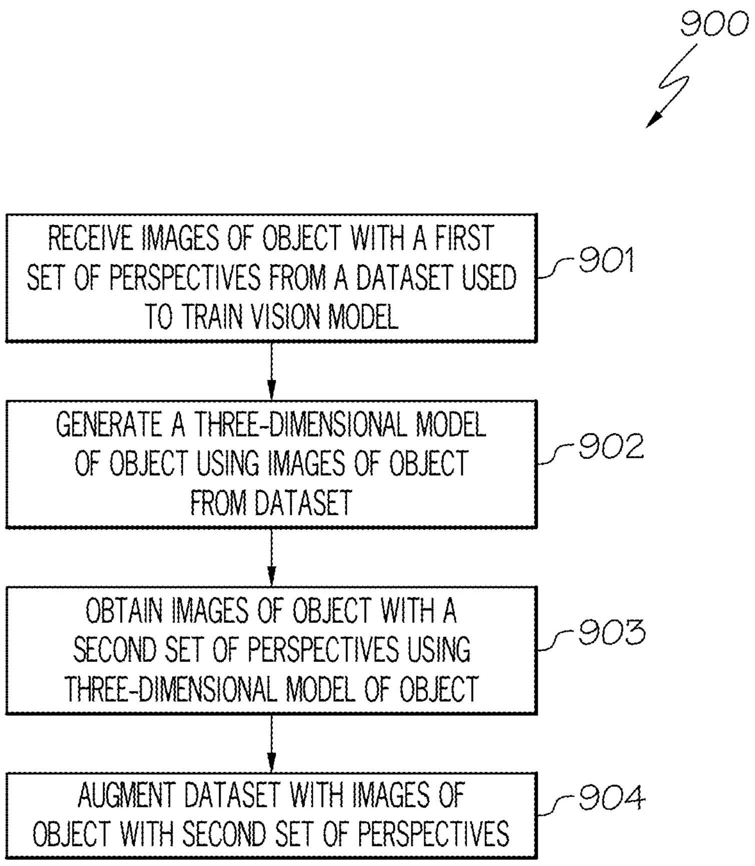
FIG. 9 is a flowchart of a method for improving the accuracy of a vision model in accordance with an embodiment of the present disclosure.
Figure 10:
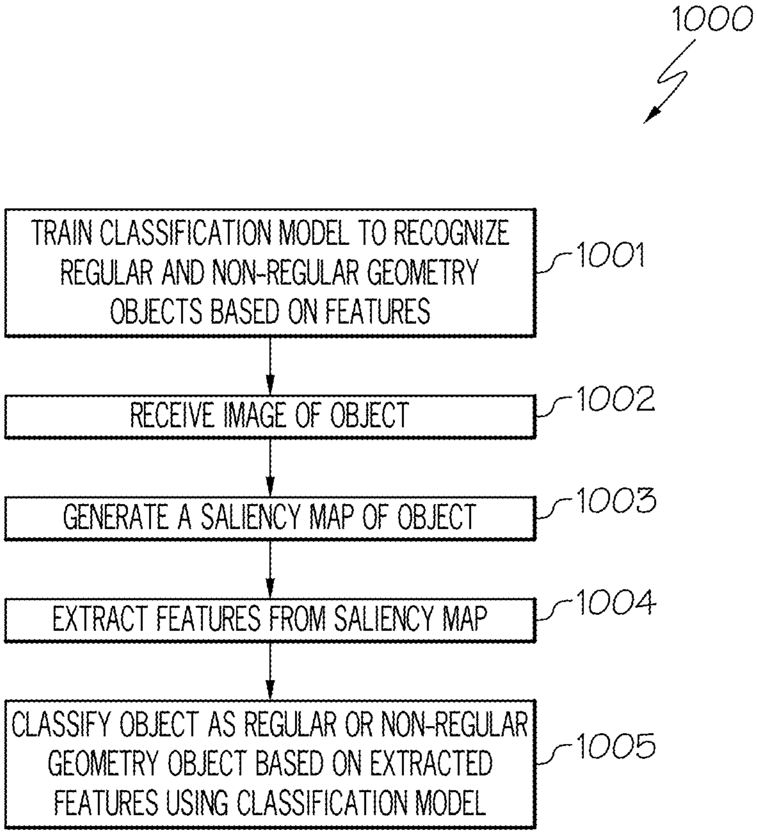
FIG. 10 is a flowchart of a method for classifying objects as regular or non-regular geometry objects in accordance with an embodiment of the present disclosure.
Figure 11:
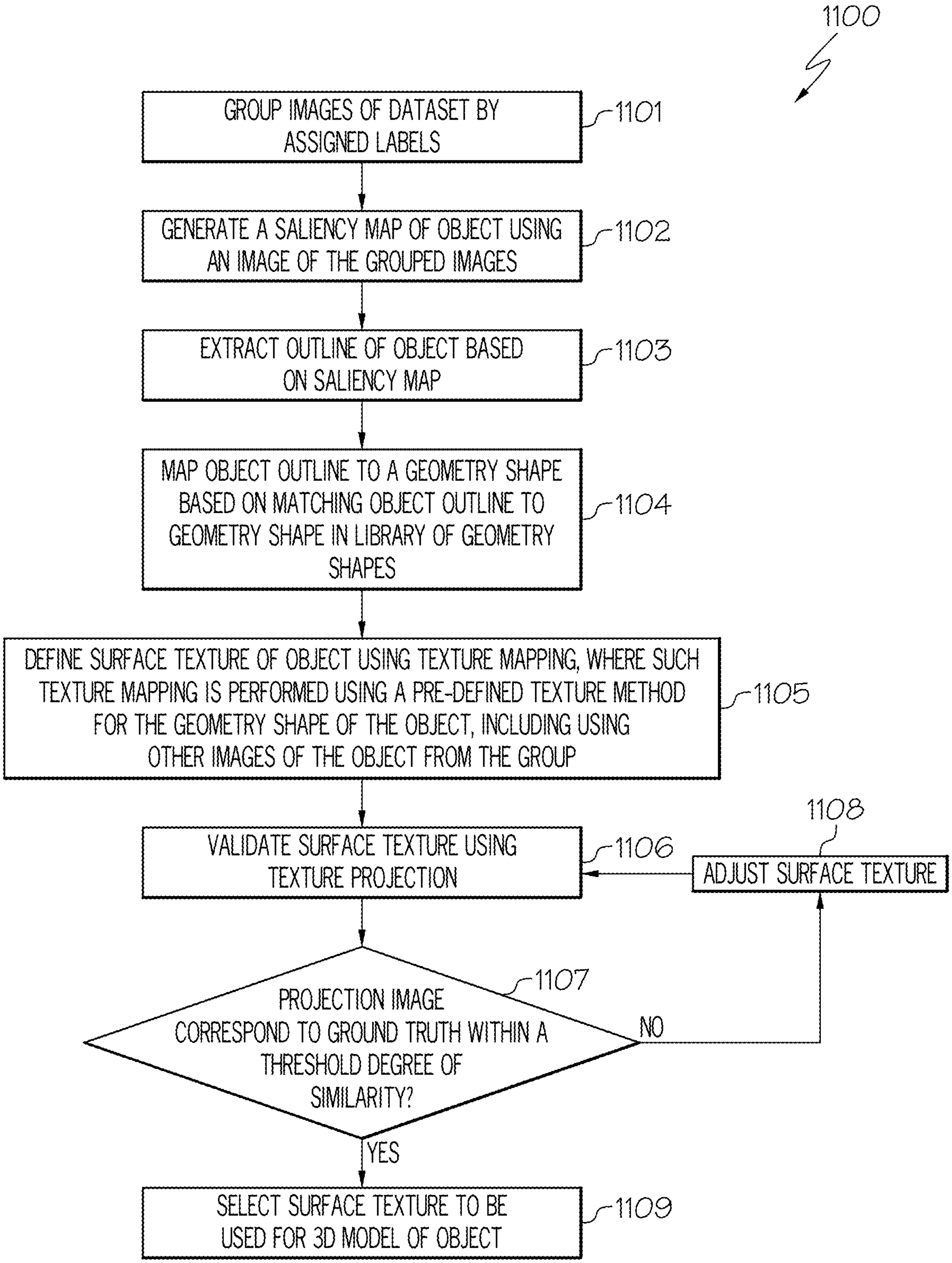
FIG. 11 is a flowchart of a method for generating a three-dimensional model of a regular geometry object in accordance with an embodiment of the present disclosure.
Figure 12:
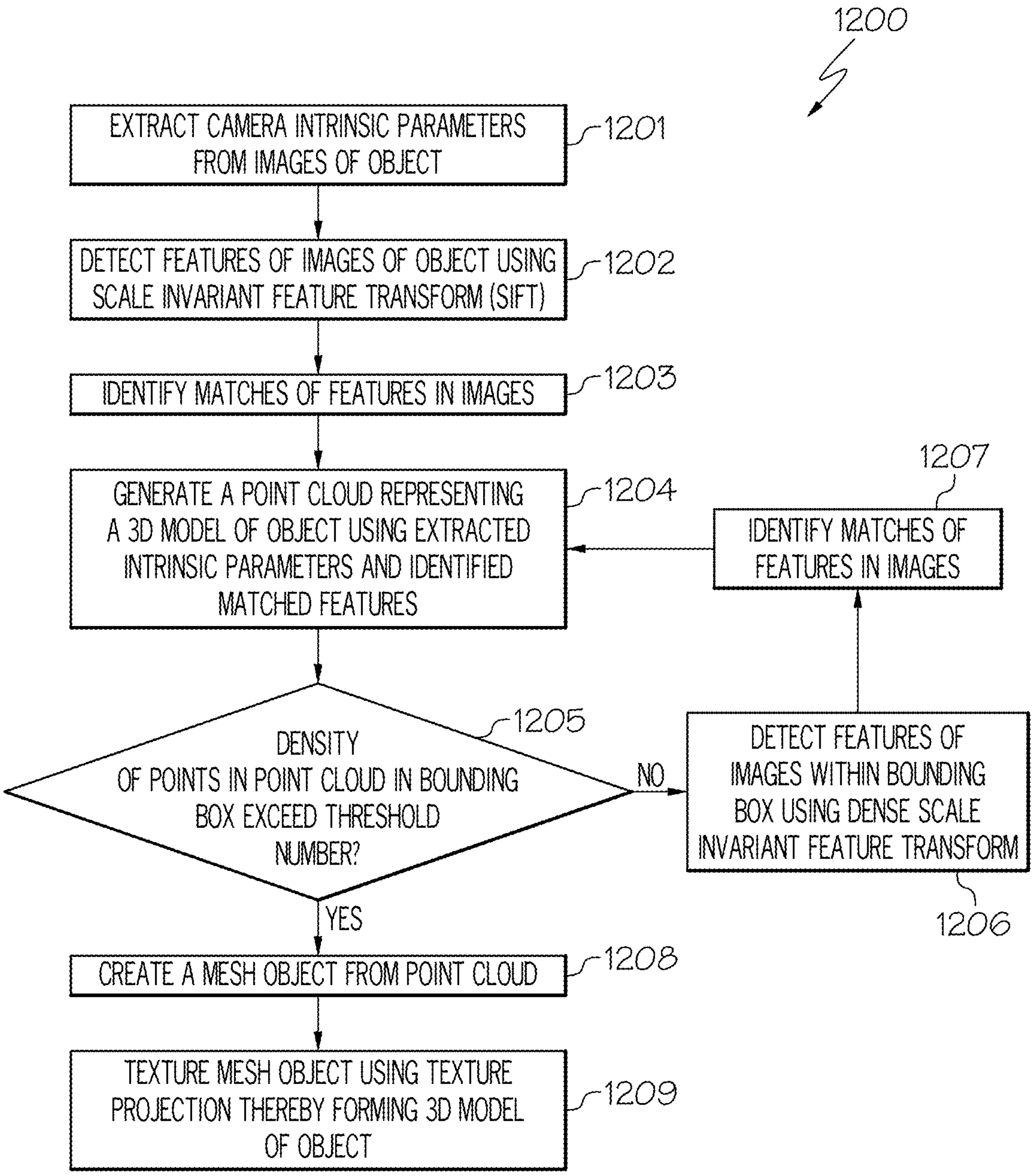
FIG. 12 is a flowchart of a method for generating a three-dimensional model of a non-regular geometry object in accordance with an embodiment of the present disclosure.
Figure 13:
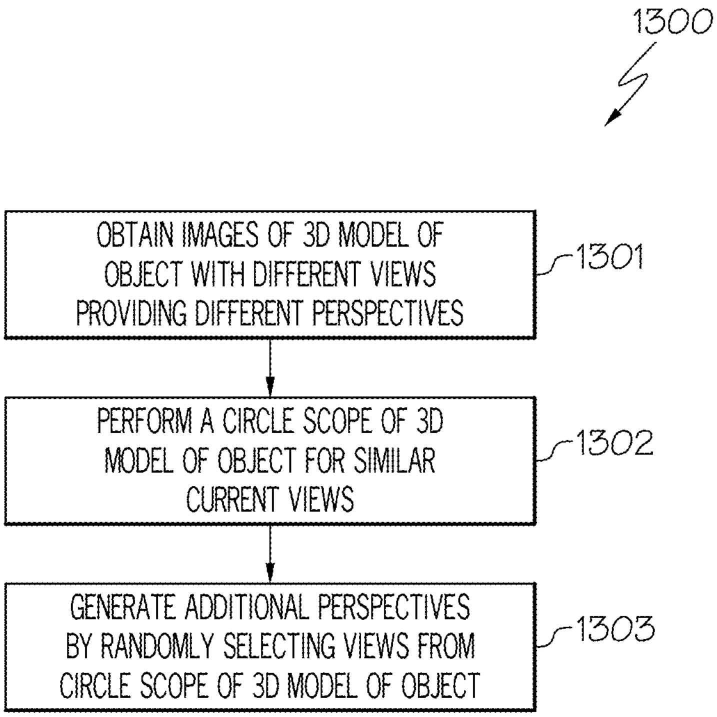
FIG. 13 is a flowchart of a method for augmenting a dataset with images of the object containing a different set of perspectives in accordance with an embodiment of the present disclosure.

The embodiments of the present disclosure provide a means for augmenting the data used to train the vision model with images of different perspectives of the object that were not previously available in the original training data as discussed below in connection with FIGS. 9-13. FIG. 9 is a flowchart of a method for improving the accuracy of a vision model. FIG. 10 is a flowchart of a method for classifying objects as regular or non-regular geometry objects. FIG. 11 is a flowchart of a method for generating a three-dimensional model of a regular geometry object. FIG. 12 is a flowchart of a method for generating a three-dimensional model of a non-regular geometry object. FIG. 13 is a flowchart of a method for augmenting a dataset with images of the object containing a different set of perspectives.

As stated above, FIG. 9 is a flowchart of a method 900 for improving the accuracy of a vision model in accordance with an embodiment of the present disclosure.

Referring to FIG. 9, in conjunction with FIGS. 1-8, in operation 901, trainer mechanism 102 receives images of an object with a first set of perspectives from a dataset 104 used to train a vision model of computer vision system 101.

Such images may be classified by classification engine 201 as being a regular geometry object or a non-regular geometry object as discussed below in connection with FIG. 10.

FIG. 10 is a flowchart of a method 1000 for classifying objects as regular or non-regular geometry objects in accordance with an embodiment of the present disclosure.

Referring to FIG. 10, in conjunction with FIGS. 1-9, in operation 1001, classification engine 201 of trainer mechanism 102 trains a classification model to recognize regular and non-regular geometry objects based on features.

As discussed above, a "regular geometry object," as used herein, refers to an object in an image in which all sides are equal and the inside angles are equal. A "non-regular geometry object," as used herein, refers to an object in an image in which not all the sides are equal and/or not all the inside angles are equal. Such a classification is used herein by trainer mechanism 102 in order to determine which method to generate a three-dimensional model of the object using the images of the object within dataset 104 as discussed further below.

In one embodiment, classification engine 201 uses a machine learning algorithm (e.g., supervised learning) to build the classification model to classify an object within an image as being a regular geometry object or a non-regular geometry object based on sample data consisting of labeled images containing the features (e.g., lines, contours, angles) of regular geometry objects and non-regular geometry objects. "Labeled images," as used herein, refer to images that are identified as containing the features of either regular geometry objects or non-regular geometry objects. In one embodiment, such images may be labelled by an expert.

Such sample data (dataset) is referred to herein as the "training data," which is used by the machine learning algorithm to make predictions or decisions as to the classification of the objects within the images. The algorithm iteratively makes predictions on the training data as to the classification of the objects within the images until the predictions achieve the desired accuracy. In one embodiment, such a desired accuracy is determined based on the classification of the object predicted by an expert based on the features of the labeled images. Examples of such supervised learning algorithms include nearest neighbor, Naïve Bayes, decision trees, linear regression, support vector machines and neural networks.

For objects classified as regular geometry objects, in one embodiment, an expert may label the image to designate the type of object (e.g., "Fisher-Price® music box") within the image. Such labels may be used by trainer mechanism 102 to group those images that are assigned the same label as discussed below in connection with generating a three-dimensional model of an object classified as being a regular geometry object.

In one embodiment, the images in dataset 104 are previously labeled by an expert to designate the type of object (e.g., "Fisher-Price® music box") within the image prior to having such objects classified as being a regular geometry object or a non-regular geometry object.

In one embodiment, after training the classification model to classify an object within an image as being a regular geometry object or a non-regular geometry based on features, classification engine 201 classifies an object of an image as a regular geometry object or a non-regular geometry using the trained classification model as discussed below.

In operation 1002, classification engine 201 of trainer mechanism 102 receives an image of an object, such as an image from dataset 104.

In operation 1003, classification engine 201 of trainer mechanism 102 generates a saliency map of the object based on the received image.

As discussed above, a "saliency map," as used herein, is an image that highlights the region on which people's eyes focus first. The goal of a saliency map is to reflect the degree of importance of a pixel to the human visual system, such as computer vision system 101.

In one embodiment, a saliency map of the object in the received image is generated by extracting features (e.g., lines, contours, angles) from the image. These processed images are used to create Gaussian pyramids, which are used to create feature maps. The saliency map may then be created by taking the mean of all the feature maps.

In one embodiment, a saliency map of the object in the received image is generated using an algorithm, such as Vanilla Gradient, as well as static saliency detection algorithms, such as spectral residual and fine grained implemented in OpenCV®.

An example of a saliency map of an object that is generated from an image of the object is shown in FIG. 3. Referring to FIG. 3, FIG. 3 illustrates a saliency map of an object in accordance with an embodiment of the present disclosure.

As shown in FIG. 3, object 301 with a square shaped outline has a corresponding saliency map 302 that depicts such features. In contrast, object 303, which corresponds to a model car, has a corresponding saliency map 304 that depicts an outline of the model car.

In operation 1004, classification engine 201 of trainer mechanism 102 extracts the features (e.g., lines, contours, angles) from the saliency map.

As stated above, such features may be extracted using various algorithms, such as the GrabCut algorithm, the SaliencyCut algorithm, etc.

In operation 1005, classification engine 201 of trainer mechanism 102 classifies an object in an image of dataset 104 as being a regular geometry object or a non-regular geometry object based on such extracted features using the trained classification model.

As discussed above, such features are used by the trained classification model to classify the object of the image as being either a regular geometry object or a non-regular geometry object. For example, using the extracted features of saliency map 302, object 301 would be classified as a regular geometry object. In another example, using the extracted features of saliency map 304, object 303 would be classified as a non-regular geometry object.

Upon classifying an object of an image as either a regular geometry object or a non-regular geometry object, the associated image (and other similar images) will then be used to generate a three-dimensional model of the object as discussed below. In particular, based on whether the object of the image is classified as either a regular geometry object or a non-regular geometry object, a different technique is used to generate a three-dimensional model of the object as discussed below.

Returning to FIG. 9, in conjunction with FIGS. 1-8 and 10, in operation 902, reconstruction engine 202 of trainer mechanism 102 generates a three-dimensional (3D) model of the object using images of the object from the dataset, such as dataset 104. In one embodiment, reconstruction engine 202 generates a three-dimensional model of an object classified as a regular geometry object as discussed below in connection with FIG. 11.

FIG. 11 is a flowchart of a method 1100 for generating a three-dimensional model of a regular geometry object in accordance with an embodiment of the present disclosure.

Referring to FIG. 11, in conjunction with FIGS. 1-9, in operation 1101, reconstruction engine 202 of trainer mechanism 102 groups images of dataset 104 by assigned labels (e.g., "Fisher-Price® music box"). For example, those images that are labeled "Fisher-Price® music box" would be grouped together.

As discussed above, in one embodiment, if there is only a single image assigned by a particular label, then the features of the image will be extracted which will be clustered to obtain a subgroup thereby forming multiple images within a group. In one embodiment, such features will be extracted from the image using various software tools, such as Feature Extraction Software from Agilent®, Marvin, FETEX, etc. Such features may be clustered into a subgroup, such as via various clustering methods, such as portioning-based clustering (e.g., k-means clustering), hierarchical-based clustering (e.g., clustering using representatives (CURE) and balanced iterative reducing clustering and using hierarchies (BIRCH)), density-based clustering (e.g., density-based spatial clustering of applications with noise (DBSCAN)), grid-based clustering (e.g., statistical information grid (STING) and wave cluster), and model-based clustering (e.g., gaussian mixture model (GMM)).

In operation 1102, reconstruction engine 202 of trainer mechanism 102 instructs classification engine 201 to generate a saliency model of the object using an image of the grouped images of dataset 104. The discussion regarding classification engine 201 generating a saliency model of the object was discussed above and will not be reiterated herein for the sake of brevity.

In operation 1103, reconstruction engine 202 of trainer mechanism 102 extracts an outline of the object based on the saliency map.

As stated above, in one embodiment, such an outline may be extracted based on outlining the shape of the object shown on the saliency map. In one embodiment, various software tools may be used by reconstruction engine 202 to extract such an outline, such as, but not limited to, Xn S ketch, Rapidresizer, Snapstouch, etc.

In operation 1104, reconstruction engine 202 of trainer mechanism 102 maps the object outline to a geometry shape based on matching the object outline to the geometry shape in a library of geometry shapes. Examples of such libraries include, but not limited to, Flatten-js, Geometric, Euclid.ts, ts-2d-geometry, OpenLayers Geometry, Turf.js, etc. In one embodiment, such a library of geometry shapes may include shapes (e.g., regular solid with six square faces) along with the corresponding type of geometry shape (e.g., cube, circle, triangle, square, rectangle, cuboid, sphere, cone, cylinder, etc.).

Upon matching the object outline with a geometry shape (e.g., regular solid with six square faces) stored in the library within a threshold degree of similarity, which may be user-designated, reconstruction engine 202 identifies the geometry shape (e.g., cube) for both this image and the other images in the group of images. In one embodiment, such a library of geometry shapes is stored in a storage device (e.g., storage device 811, 815) of trainer mechanism 102.

In one embodiment, reconstruction engine 202 matches the object outline with shapes in the library of geometry shapes using various software tools, including, but not limited to, CurvSurf, SegMatch, etc.

In one embodiment, reconstruction engine 202 uses a pattern matching algorithm that uses the pixel intensity information as the primary feature for matching. As an alternative, reconstruction engine 202 uses boundary edges to characterize the shape of the extracted outline of the object and then uses this characterization to search for similar shapes. In one embodiment, reconstruction engine 202 utilizes Vision Assistant Express for geometric matching.

In operation 1105, reconstruction engine 202 of trainer mechanism 102 defines a surface texture of the object using texture mapping, where such texture mapping is performed using a pre-defined texture method for the geometry shape of the object, including using the other images from the grouped images of the dataset. "Texture mapping," as used herein, refers to the application of patterns or image to three-dimensional graphics to enhance the realism of their surfaces. In one embodiment, reconstruction engine 202 utilizes a data structure that contains a list of pre-defined texture methods for an associated geometry shape. For example, for a cube, the texture method to be utilized is PaintCube using the other images in the same group to attach to the different sides of the cube shaped object. In one embodiment, reconstruction engine 202 utilizes a shape-aware texture-mapping tool, such as Autodesk® 3ds Max, to apply the appropriate texture mapping to the identified geometric shape. In one embodiment, such a data structure is populated by an expert and stored in a storage device (e.g., storage device 811, 815) of trainer mechanism 102.

In operation 1106, reconstruction engine 202 of trainer mechanism 102 validates the surface texture using texture projection to form a projection image(s). "Texture projection," as used herein, refers to a method of texture mapping that allows a textured image to be projected onto a scene as if by a slide projector. Reconstruction engine 202 utilizes various software tools for performing texture projection including, but not limited to, Vectorworks®, SketchUp®, etc.

In operation 1107, reconstruction engine 202 of trainer mechanism 102 determines whether the projection image corresponds to the ground truth of the image within a threshold degree of similarity, which may be user-designated. As stated above, the "ground truth," as used herein, refers to information that is known to be real or true, provided by direct observation and measurement. In one embodiment, the ground truth of an image is obtained by reconstruction engine 202 using the software tool ImageJ. Such a ground truth image is compared to the projection image by reading the images and then reshaping them into a single row vector. The single row vectors for the ground truth image and the projection image can then be compared. In one embodiment, the similarity is based on the closeness of the values of the elements of these vectors.

In one embodiment, reconstruction engine 202 utilizes Image Similarity API from DeepAI® to compare two images and returns a value that informs how visually similar they are. The lower the score, the more contextually similar the two images are with a score of "0" being identical. If the score is below a threshold number, then it is deemed that the projection image corresponds to the ground truth of the image within the threshold degree of similarity.

If the projection image(s) do not correspond to the ground truth image within a threshold degree of similarity, then, in operation 1108, reconstruction engine 202 of trainer mechanism 102 adjusts the surface texture.

As discussed above, in one embodiment, such surface texture is adjusted by modifying the texture properties, such as inverting the texture material along a particular axis, modifying the mapping type (e.g., spherical mapping, planar mapping), changing the material size, etc. In one embodiment, such modifications are randomly implemented. In one embodiment, the surface texture is adjusted by reconstruction engine 202 as discussed above using various software tools including, but not limited to, Autodesk® 3ds Max, Sketchup®, etc.

Upon adjusting the surface texture, reconstruction engine 202 of trainer mechanism 102 validates the adjusted surface texture using texture projection to form a projection image (s) in operation 1106.

If, however, the projection image does correspond to the ground truth image within a threshold degree of similarity, then, in operation 1109, reconstruction engine 202 of trainer mechanism 102 selects the surface texture to be used for the three-dimensional model of the object. Reconstruction engine 202 then generates the three-dimensional model of the object using the selected surface texture.

In one embodiment, reconstruction engine 202 generates a three-dimensional model of an object classified as a non-regular geometry object as discussed below in connection with FIG. 12.

FIG. 12 is a flowchart of a method 1200 for generating a three-dimensional model of a non-regular geometry object in accordance with an embodiment of the present disclosure.

Referring to FIG. 12, in conjunction with FIGS. 1-9, in operation 1201, reconstruction engine 202 of trainer mechanism 102 extracts camera intrinsic parameters from the images of the object from dataset 104, such as the focus, width and height. In one embodiment, such parameters may be extracted in the format of a matrix (e.g., f;0;ppx;0;f;ppy;0;0;1), such as a camera intrinsic matrix.

As stated above, in one embodiment, reconstruction engine 202 extracts camera intrinsic parameters from the images of the object from dataset 104 using various software tools, including, but not limited to, CamChecker.

In operation 1202, reconstruction engine 202 of trainer mechanism 102 detects the features of the images of the object from dataset 104 using scale invariant feature transform (SIFT).

As discussed above, SIFT, as used herein, refers to an algorithm used to detect and describe local features in digital images. In one embodiment, SIFT locates certain keypoints and then furnishes them with quantitative information ("descriptors") which can, for example, be used for object recognition.

In one embodiment, features are detected by reconstruction engine 202 using SIFT by using the maxima from a difference-of-Gaussians pyramid as the features. In one embodiment, a dominant gradient direction is found. To make it rotation-invariant, the descriptor is rotated to fit this orientation.

In one embodiment, features of the images of the object from dataset 104 are detected using speeded-up robust features (SURF). In SURF, the difference-of-Gaussians pyramid is replaced with a Hessian matrix-based blob detector. Also, instead of evaluating the gradient histograms, SURF computes for the sums of gradient components and their sums of their absolute values.

In operation 1203, reconstruction engine 202 of trainer mechanism 102 identifies the matches of the features in the images.

As stated above, in one embodiment, the SIFT features extracted from the images are matched against each other to find the k nearest-neighbors for each feature. These correspondences are then used to find m candidate matching images for each image.

In one embodiment, features can be extracted from each of the images of the object using SIFT to provide a "feature description" of the object for that image. The extracted features from each of these images may then be compared with one another to identify matching features based on the Euclidean distance of their feature vectors. From the full set of matches, subsets of keypoints that agree on the object and its location, scale, and orientation in the image are identified to filter out good matches.

In one embodiment, reconstruction engine 202 matches the features detected from the images using a matching algorithm that tracks features from one image to another, such as the Lucas-Kanade tracker.

In one embodiment, to address the possibility of matching features incorrectly, such incorrect matches are filtered. In one embodiment, reconstruction engine 202 uses an algorithm (e.g., random sample consensus (RANSAC)) to remove such outlier correspondences. In one embodiment, RANSAC is used to solve the location determination problem, where the objective is to determine the points in space that project onto an image into a set of landmarks with known locations.

In operation 1204, reconstruction engine 202 of trainer mechanism 102 generates a point cloud representing a three-dimensional model of the object using the extracted intrinsic parameters and the identified matched features.

As discussed above, a "point cloud," as used herein, refers to a set of data points in space. In one embodiment, such points represent a three-dimensional shape or object. In one embodiment, each point position has its set of cartesian coordinates (x, y, z).

As also discussed above, reconstruction engine 202 matches the features detected from the images, such as by using a matching algorithm that tracks features from one image to another, such as the Lucas-Kanade tracker. In one embodiment, the feature trajectories over time as well as the extracted camera intrinsic parameters are then used to reconstruct their three-dimensional positions and motion. An alternative is given by so-called direct approaches, where geometric information (three-dimensional structure and motion) is directly estimated from the images without intermediate abstraction to features or corners.

In one embodiment, reconstruction engine 202 constructs a three-dimensional structure from the two-dimensional images of the object of dataset 104 by using the structure from motion imaging technique. "Structure from motion," as used herein, refers to a photogrammetric range imaging technique for estimating three-dimensional structures from two-dimensional image sequences that may be coupled with local motion signals.

In one embodiment, reconstruction engine 202 constructs a three-dimensional structure ("global structure") using the structure from motion imaging technique by estimating the position and orientation of each image in a common three-dimensional coordinate frame. The final output is a point cloud of a three-dimensional object. For example, the feature trajectories over time as well as the extracted camera intrinsic parameters are used to construct a three-dimensional structure from a set of two-dimensional images using the structure from motion approach as illustrated in FIG. 4.

In operation 1205, reconstruction engine 202 of trainer mechanism 102 determines whether the density of points in the point cloud, such as point cloud 500, in a bounding box exceeds a threshold number, which may be user-designated. A "bounding box" or "bounding box area," as used herein, refers to an imaginary area that serves as a point of reference for object detection.

If the density of points in the point cloud, such as point cloud 500, does not exceed the threshold number, then, in operation 1206, reconstruction engine 202 of trainer mechanism 102 detects the features of the images within the bounding box or bounding box area using dense scale invariant feature transform.

"Dense scale invariant feature transform," as used herein, refers to the implementation of a dense version of SIFT ("DSIFT"). In DSIFT, the SIFT descriptor is applied at dense grids. That is, the SIFT descriptor is computed over dense grids in the image domain.

As discussed above, a "bounding box" or "bounding box area," as used herein, refers to an imaginary area that serves as a point of reference for object detection. As also previously discussed, an illustration of a bounding box area used in connection with DSIFT is shown in FIG. 6.

In operation 1207, reconstruction engine 202 of trainer mechanism 102 identifies the matches of these features in the images.

As discussed above, in one embodiment, the features detected from these images are matched against each other to find the k nearest-neighbors for each feature. These correspondences are then used to find m candidate matching images for each image.

In one embodiment, the detected features from each of these images may be compared with one another to identify matching features based on the Euclidean distance of their feature vectors. From the full set of matches, subsets of keypoints that agree on the object and its location, scale, and orientation in the image are identified to filter out good matches.

In one embodiment, reconstruction engine 202 matches the features detected from the images using a matching algorithm that tracks features from one image to another, such as the Lucas-Kanade tracker.

In one embodiment, to address the possibility of matching features incorrectly, such incorrect matches are filtered. In one embodiment, reconstruction engine 202 uses an algorithm (e.g., random sample consensus (RANSAC)) to remove such outlier correspondences. In one embodiment, RANSAC is used to solve the location determination problem, where the objective is to determine the points in space that project onto an image into a set of landmarks with known locations.

Upon identifying matches of such features in these images, reconstruction engine 202 of trainer mechanism 102 generates a new point cloud, such as point cloud 500, in operation 1204.

If, however, the density of points in the point cloud, such as point cloud 500, exceeds the threshold number, then, in operation 1208, reconstruction engine 202 of trainer mechanism 102 creates a mesh object from the point cloud.

As discussed above, a "mesh object," as used herein, refers to a shape composed of triangles and vertices. In one embodiment, the point cloud, such as point cloud 500, stores the locations for points; whereas, the mesh object converts those points into triangles and vertices. As also previously discussed, an illustration of such a mesh object is shown in FIG. 7.

Furthermore, as stated above, in one embodiment, reconstruction engine 202 creates the mesh object, such as mesh object 700, from the point cloud, such as point cloud 500, using various software tools, including, but not limited to, Pointfuse®, MeshLab, etc.

In one embodiment, reconstruction engine 202 creates the mesh object, such as mesh object 700, from the point cloud, such as point cloud 500, using one of the following meshing algorithms: Ball-Pivoting Algorithm and Poisson Reconstruction.

In one embodiment, reconstruction engine 202 creates the mesh object, such as mesh object 700, from the point cloud, such as point cloud 500, using the multi-view environment (an implementation of a complete end-to-end pipeline for image-based geometry reconstruction).

Upon creating the mesh object from the point cloud, in operation 1209, reconstruction engine 202 of trainer mechanism 102 textures the mesh object, such as mesh object 700, using texture projection thereby forming the three-dimensional model of the object. "Texture projection," as discussed above, refers to a method of texture mapping that allows a textured image to be projected onto a scene as if by a slide projector. Reconstruction engine 202 utilizes various software tools for performing texture projection including, but not limited to, Vectorworks®, SketchUp®, etc. In one embodiment, reconstruction engine 202 utilizes the mvs-texrecon algorithm to execute the texture projection.

Returning now to FIG. 9, in conjunction with FIGS. 1-8 and 10-12, in operation 903, data augmentation tool 203 of trainer mechanism 102 obtains images of the object with a second set of perspective using the three-dimensional model of the object.

In operation 904, data augmentation tool 203 of trainer mechanism 102 augments the dataset, such as dataset 104, with the images of the object with the second set of perspectives (forming dataset 105). By augmenting dataset 104 with images of different perspectives of the object that were not previously available in the original training data (dataset 104), a vision model may be more effectively trained thereby improving the accuracy of the vision model, such as being better able to identify objects in the image, etc.

A further discussion regarding data augmentation tool 203 augmenting the dataset, such as dataset 104, with the images of the object with the second set of perspectives to form dataset 105 is provided below in connection with FIG. 13.

FIG. 13 is a flowchart of a method 1300 for augmenting a dataset with images of the object containing a different set of perspectives in accordance with an embodiment of the present disclosure.

In operation 1301, data augmentation tool 203 of trainer mechanism 102 obtains images of the three-dimensional model of the object with different views (different from the views of the images contained in the original training set, such as in dataset 104) providing different perspectives.

As discussed above, for example, data augmentation tool 203 selects additional views from the views of the object previously shown in the images of dataset 104. For instance, the images from dataset 104 may show the top, left and sides of an object. Data augmentation tool 203 may then select views from the top-left, bottom-right, etc. of the three-dimensional model of the object thereby providing different perspectives of the object. Such different views may be captured via a screenshot or via various software tools, such as Agisoft Metashape®. Dataset 104 may then be augmented with these images forming an augmented dataset 105 that includes a greater number of perspectives of the object. By augmenting dataset 104 with images of different perspectives of the object that were not previously available in the original training dataset (dataset 104), a vision model may be more effectively trained thereby improving the accuracy of the vision model, such as being better able to identify objects in the image, etc.

In one embodiment, data augmentation tool 203 may also obtain images that are similar to the views of the images contained in dataset 104 but with a different perspective, such as being zoomed in/zoomed out. For example, in operation 1302, data augmentation tool 203 of trainer mechanism 102 performs a circle scope of the three-dimensional model of the object for similar current views (similar views of the images contained in dataset 104, such as a view of the center of the object). A "circle scope," as used herein, refers to the area of the three-dimensional model of the object that is formed by performing a circle around the three-dimensional model.

In operation 1303, data augmentation tool 203 of trainer mechanism 102 generates additional perspectives that are similar to the current views (views of the images of dataset 104) by randomly selecting views from the circle scope of the three-dimensional model of the object. Such different perspectives may be captured via a screenshot or via various software tools, such as Agisoft Metashape®. Dataset 104 may then be augmented with these images forming an augmented dataset 105 that includes a greater number of perspectives of the object. By augmenting dataset 104 with images of different perspectives of the object that were not previously available in the original training data (dataset 104), a vision model may be more effectively trained thereby improving the accuracy of the vision model, such as being better able to identify objects in the image, etc.

As a result of the foregoing, embodiments of the present disclosure provide a means for augmenting the data used to train the vision model with images of different perspectives of the object that were not previously available in the original training data thereby improving the accuracy of the visional model.

Furthermore, the principles of the present disclosure improve the technology or technical field involving computer vision. As discussed above, computer vision models are designed to translate visual data based on features and contextual information identified during training. This enables models to interpret images and video and apply those interpretations to predictive or decision making tasks.

Such computer vision models are trained to answer questions about an image, such as what objects are in the image, where are those objects in the image, what are the key points on an object, etc. Such training involves a dataset, which may include different images of the same object (e.g., pair of shoes). While such a dataset may include images of several perspectives of the object, there may be some perspectives of the object that were not included in the dataset. As a result, the accuracy of the vision model trained by this dataset may be relatively low. Consequently, there have been various techniques to identify the appropriate data to augment the dataset used to train the computer vision model in order to improve the accuracy of the vision model. For example, images may be geometrically transformed, such as via flipping the images vertically or horizontally, rotation, cropping, scaling, etc. The dataset may then be augmented with such new images. In another examples, color in the images may be transformed, such as via color conversion, adding noise, coarse dropout, etc. The dataset may then be augmented with such transformed images. In a further example, features from different images may be mixed to generate new images. The dataset may then be augmented with such new images. Unfortunately, such transformations are based on the contents of the images as opposed to different perspectives of the object. As a result, the dataset used to train the vision model may still not include images from certain perspectives thereby diminishing the accuracy of the vision model, such as being able to identify objects in the image, etc. Consequently, there is not currently a means for effectively augmenting the dataset used to train the vision model, such as with images of different perspectives of the object that were not previously available in the original training data.

Embodiments of the present disclosure improve such technology by receiving images of an object with a first set of perspectives from a dataset used to train the vision model. A three-dimensional model of the object is then generated using the images of the object from the dataset. The present disclosure utilizes different techniques for generating such a three-dimensional model of the object based on whether the object is classified as a regular geometry object or a non-regular geometry object. A "regular geometry object," as used herein, refers to an object in an image in which all sides are equal and the inside angles are equal. A "non-regular geometry object," as used herein, refers to an object in an image in which not all the sides are equal and/or not all the inside angles are equal. Using the three-dimensional model of the object, images of the object with a second set of perspectives are obtained. For example, the second set of perspectives may include different perspectives than the perspectives of the object from the images contained in the original training data. For instance, such different perspectives may be obtained based on different views of the object provided by the three-dimensional model of the object than the views of the object provided by the images contained in the original training data. The dataset used to train the vision model may then be augmented with such images of the object with a second set of perspectives. In this manner, the dataset used to train the vision model includes a greater number of perspectives of the object thereby improving the accuracy of the vision model, such as being able to identify objects in the image, etc. Furthermore, in this manner, there is an improvement in the technical field involving computer vision.

The technical solution provided by the present disclosure cannot be performed in the human mind or by a human using a pen and paper. That is, the technical solution provided by the present disclosure could not be accomplished in the human mind or by a human using a pen and paper in any reasonable amount of time and with any reasonable expectation of accuracy without the use of a computer.

In one embodiment of the present disclosure, a computer-implemented method for improving accuracy of a vision model comprises receiving images of an object with a first set of perspectives from a dataset used to train the vision model. The method further comprises generating a three-dimensional model of the object using the images of the object from the dataset. The method additionally comprises obtaining images of the object with a second set of perspectives using the three-dimensional model of the object. Furthermore, the method comprises augmenting the dataset with the images of the object with the second set of perspectives.

Furthermore, in one embodiment of the present disclosure, the method additionally comprises training a classification model to recognize regular and non-regular geometry objects based on features.

Additionally, in one embodiment of the present disclosure, the method further comprises generating a saliency map of the object using an image of the object from the dataset. The method additionally comprises extracting features from the saliency map. Furthermore, the method comprises classifying the object as the regular geometry object or the non-regular geometry object based on the extracted features by the classification model.

Furthermore, in one embodiment of the present disclosure, the method additionally comprises grouping images of the dataset with the first set of perspectives by assigned labels. The method further comprises generating a saliency map of the object using an image of the grouped images of the dataset. Furthermore, the method comprises extracting an outline of the object based on the saliency map. Additionally, the method comprises mapping the object outline to a geometry shape based on matching the object outline to the geometry shape in a library of geometry shapes. In addition, the method comprises defining a surface texture of the object using texture mapping using a pre-defined texture method for the geometry shape as well as using other images from the grouped images of the dataset. The method further comprises validating the surface texture using texture projection to form a projection image. The method additionally comprises selecting the surface texture to be used for the three-dimensional model of the object in response to the projection image corresponding to a ground truth within a threshold degree of similarity.

Additionally, in one embodiment of the present disclosure, the method further comprises extracting intrinsic parameters from the images of the object with the first set of perspectives from the dataset. The method additionally comprises detecting features of the images using scale invariant feature transform. Furthermore, the method comprises identifying matches of the features of the images. Additionally, the method comprises generating a point cloud using the extracted intrinsic parameters and the identified matched features. In addition, the method comprises creating a mesh object of the point cloud in response to a density of points in the point cloud in a bounding box exceeding a threshold number. The method further comprises texturing the mesh object using text projection thereby forming the three-dimensional model of the object.

Furthermore, in one embodiment of the present disclosure, the method additionally comprises detecting features of images within the bounding box of an image domain using a dense scale invariant feature transform in response to the density of points in the point cloud in the bounding box not exceeding the threshold number. The method further comprises identifying matches of the features of the images within the bounding box of the image domain.

Additionally, in one embodiment of the present disclosure, the method further comprises performing a circle scope of the three-dimensional model of the object for views. The method additionally comprises generating additional perspectives by randomly selecting views from the circle scope of the three-dimensional model of the object, where the additional perspectives form part of the second set of perspectives.

Other forms of the embodiments of the computer-implemented method described above are in a system and in a computer program product.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for improving accuracy of a vision model, the method comprising:

receiving images of an object with a first set of perspectives from a dataset used to train said vision model;

generating a three-dimensional model of said object using said images of said object from said dataset;

obtaining images of said object with a second set of perspectives using said three-dimensional model of said object; and augmenting said dataset with said images of said object with said second set of perspectives.

2. The method as recited in claim 1 further comprising:

training a classification model to recognize regular and non-regular geometry objects based on features.

3. The method as recited in claim 2 further comprising:

generating a saliency map of said object using an image of said object from said dataset;

extracting features from said saliency map; and classifying said object as said regular geometry object or said non-regular geometry object based on said extracted features by said classification model.

4. The method as recited in claim 1 further comprising:

grouping images of said dataset with said first set of perspectives by assigned labels;

generating a saliency map of said object using an image of said grouped images of said dataset;

extracting an outline of said object based on said saliency map;

mapping said object outline to a geometry shape based on matching said object outline to said geometry shape in a library of geometry shapes;

defining a surface texture of said object using texture mapping using a pre-defined texture method for said geometry shape as well as using other images from said grouped images of said dataset;

validating said surface texture using texture projection to form a projection image; and selecting said surface texture to be used for said three-dimensional model of said object in response to said projection image corresponding to a ground truth within a threshold degree of similarity.

5. The method as recited in claim 1 further comprising:

extracting intrinsic parameters from said images of said object with said first set of perspectives from said dataset;

detecting features of said images using scale invariant feature transform;

identifying matches of said features of said images;

generating a point cloud using said extracted intrinsic parameters and said identified matched features;

creating a mesh object of said point cloud in response to a density of points in said point cloud in a bounding box exceeding a threshold number; and texturing said mesh object using texture projection thereby forming said three-dimensional model of said object.

6. The method as recited in claim 5 further comprising:

detecting features of images within said bounding box of an image domain using a dense scale invariant feature transform in response to said density of points in said point cloud in said bounding box not exceeding said threshold number; and identifying matches of said features of said images within said bounding box of said image domain.

7. The method as recited in claim 1 further comprising:

performing a circle scope of said three-dimensional model of said object for views; and generating additional perspectives by randomly selecting views from said circle scope of said three-dimensional model of said object, wherein said additional perspectives form part of said second set of perspectives.

8. A computer program product for improving accuracy of a vision model, the computer program product comprising one or more computer readable storage mediums having program code embodied therewith, the program code comprising programming instructions for:

receiving images of an object with a first set of perspectives from a dataset used to train said vision model;

generating a three-dimensional model of said object using said images of said object from said dataset;

obtaining images of said object with a second set of perspectives using said three-dimensional model of said object; and augmenting said dataset with said images of said object with said second set of perspectives.

9. The computer program product as recited in claim 8, wherein the program code further comprises the programming instructions for:

training a classification model to recognize regular and non-regular geometry objects based on features.

10. The computer program product as recited in claim 9, wherein the program code further comprises the programming instructions for:

generating a saliency map of said object using an image of said object from said dataset;

extracting features from said saliency map; and classifying said object as said regular geometry object or said non-regular geometry object based on said extracted features by said classification model.

11. The computer program product as recited in claim 8, wherein the program code further comprises the programming instructions for:

grouping images of said dataset with said first set of perspectives by assigned labels;

generating a saliency map of said object using an image of said grouped images of said dataset;

extracting an outline of said object based on said saliency map;

mapping said object outline to a geometry shape based on matching said object outline to said geometry shape in a library of geometry shapes;

defining a surface texture of said object using texture mapping using a pre-defined texture method for said geometry shape as well as using other images from said grouped images of said dataset;

validating said surface texture using texture projection to form a projection image; and selecting said surface texture to be used for said three-dimensional model of said object in response to said projection image corresponding to a ground truth within a threshold degree of similarity.

12. The computer program product as recited in claim 8, wherein the program code further comprises the programming instructions for:

extracting intrinsic parameters from said images of said object with said first set of perspectives from said dataset;

detecting features of said images using scale invariant feature transform;

identifying matches of said features of said images;

generating a point cloud using said extracted intrinsic parameters and said identified matched features;

creating a mesh object of said point cloud in response to a density of points in said point cloud in a bounding box exceeding a threshold number; and texturing said mesh object using texture projection thereby forming said three-dimensional model of said object.

13. The computer program product as recited in claim 12, wherein the program code further comprises the programming instructions for:

detecting features of images within said bounding box of an image domain using a dense scale invariant feature transform in response to said density of points in said point cloud in said bounding box not exceeding said threshold number; and identifying matches of said features of said images within said bounding box of said image domain.

14. The computer program product as recited in claim 8, wherein the program code further comprises the programming instructions for:

performing a circle scope of said three-dimensional model of said object for views; and generating additional perspectives by randomly selecting views from said circle scope of said three-dimensional model of said object, wherein said additional perspectives form part of said second set of perspectives.

15. A system, comprising:

a memory for storing a computer program for improving accuracy of a vision model; and a processor connected to said memory, wherein said processor is configured to execute program instructions of the computer program comprising:

receiving images of an object with a first set of perspectives from a dataset used to train said vision model;

generating a three-dimensional model of said object using said images of said object from said dataset;

obtaining images of said object with a second set of perspectives using said three-dimensional model of said object; and augmenting said dataset with said images of said object with said second set of perspectives.

16. The system as recited in claim 15, wherein the program instructions of the computer program further comprise:

training a classification model to recognize regular and non-regular geometry objects based on features.

17. The system as recited in claim 16, wherein the program instructions of the computer program further comprise:

generating a saliency map of said object using an image of said object from said dataset;

extracting features from said saliency map; and classifying said object as said regular geometry object or said non-regular geometry object based on said extracted features by said classification model.

18. The system as recited in claim 15, wherein the program instructions of the computer program further comprise:

grouping images of said dataset with said first set of perspectives by assigned labels;

generating a saliency map of said object using an image of said grouped images of said dataset;

extracting an outline of said object based on said saliency map;

mapping said object outline to a geometry shape based on matching said object outline to said geometry shape in a library of geometry shapes;

defining a surface texture of said object using texture mapping using a pre-defined texture method for said geometry shape as well as using other images from said grouped images of said dataset;

validating said surface texture using texture projection to form a projection image; and selecting said surface texture to be used for said three-dimensional model of said object in response to said projection image corresponding to a ground truth within a threshold degree of similarity.

19. The system as recited in claim 15, wherein the program instructions of the computer program further comprise:

extracting intrinsic parameters from said images of said object with said first set of perspectives from said dataset;

detecting features of said images using scale invariant feature transform;

identifying matches of said features of said images;

generating a point cloud using said extracted intrinsic parameters and said identified matched features;

creating a mesh object of said point cloud in response to a density of points in said point cloud in a bounding box exceeding a threshold number; and texturing said mesh object using texture projection thereby forming said three-dimensional model of said object.

20. The system as recited in claim 19, wherein the program instructions of the computer program further comprise:

detecting features of images within said bounding box of an image domain using a dense scale invariant feature transform in response to said density of points in said point cloud in said bounding box not exceeding said threshold number; and identifying matches of said features of said images within said bounding box of said image domain.

* * * * *